United States Patent
Prabhu

(10) Patent No.: US 8,621,869 B2
(45) Date of Patent: Jan. 7, 2014

(54) HEATING A REACTION CHAMBER

(75) Inventor: Edan Prabhu, Mission Viejo, CA (US)

(73) Assignee: Ener-Core Power, Inc., Irvine, CA (US)

( * ) Notice: Subject to any disclaimer, the term of this patent is extended or adjusted under 35 U.S.C. 154(b) by 754 days.

(21) Appl. No.: 12/870,021

(22) Filed: Aug. 27, 2010

(65) Prior Publication Data

US 2010/0319355 A1  Dec. 23, 2010

Related U.S. Application Data

(63) Continuation-in-part of application No. 12/772,622, filed on May 3, 2010.

(60) Provisional application No. 61/174,857, filed on May 1, 2009.

(51) Int. Cl.
*F02C 1/00* (2006.01)

(52) U.S. Cl.
USPC .............................................. 60/737; 431/12

(58) Field of Classification Search
USPC .......... 60/736, 737, 780; 431/2, 12, 165, 174, 431/177, 178, 179, 351; 110/212, 213, 241
See application file for complete search history.

(56) References Cited

U.S. PATENT DOCUMENTS

| | | | |
|---|---|---|---|
| 2,303,381 A | 12/1942 | New | |
| 2,433,932 A | 1/1948 | Stosick | |
| 2,443,841 A | 6/1948 | Sweeney | |
| 2,624,172 A | 1/1953 | Houdry | |
| 2,630,678 A | 3/1953 | Pratt | |
| 2,655,786 A | 10/1953 | Carr | |
| 2,795,054 A | 6/1957 | Bowen, III | |
| 3,313,103 A | 4/1967 | Johnson | |
| 3,661,497 A | 5/1972 | Castellucci et al. | |
| 3,731,485 A | 5/1973 | Rudolph et al. | |
| 3,732,911 A | 5/1973 | Lowe et al. | |
| 3,769,922 A | 11/1973 | Furlong et al. | |
| 3,790,350 A | 2/1974 | Haensel | |
| 3,797,231 A | 3/1974 | McLean | |

(Continued)

FOREIGN PATENT DOCUMENTS

| | | |
|---|---|---|
| CH | 319366 A | 2/1957 |
| GB | 2080934 A | 2/1982 |

(Continued)

OTHER PUBLICATIONS

"Flameless Thermal Oxidizers" <http://www.selasfluid.com/international/web/le/us/likelesfus.nsf/docbyalias/flameless_thermal>, Copyright 2008, 3 pages, retrieved May 13, 2010.

(Continued)

*Primary Examiner* — Phutthiwat Wongwian
(74) *Attorney, Agent, or Firm* — McDermott Will & Emery LLP

(57) ABSTRACT

An air/fuel mixture is received in an oxidation reaction chamber. The air/fuel mixture has a low concentration of fuel, for example, below a lower explosive limit (LEL). The mixture is received while a temperature of a region in the oxidation reaction chamber is below a temperature sufficient to oxidize the fuel. The temperature of the region is raised to at least the oxidation temperature (the temperature sufficient to oxidize the fuel) primarily using heat energy released from oxidizing the air/fuel mixture in a different region in the reaction chamber.

28 Claims, 9 Drawing Sheets

(56) References Cited

U.S. PATENT DOCUMENTS

| | | | |
|---|---|---|---|
| 3,810,732 | A | 5/1974 | Koch |
| 3,928,961 | A | 12/1975 | Pfefferle |
| 3,942,264 | A | 3/1976 | Zenkner |
| 3,943,705 | A | 3/1976 | DeCorso et al. |
| 3,975,900 | A | 8/1976 | Pfefferle |
| 4,052,143 | A | 10/1977 | Sandviknes |
| 4,111,644 | A | 9/1978 | Buckholdt |
| 4,116,005 | A | 9/1978 | Willyoung |
| 4,125,359 | A | 11/1978 | Lempa |
| 4,163,366 | A | 8/1979 | Kent |
| 4,168,950 | A | 9/1979 | Seemann et al. |
| 4,187,672 | A | 2/1980 | Rasor |
| 4,192,642 | A | 3/1980 | Lempa |
| 4,202,169 | A | 5/1980 | Acheson et al. |
| 4,209,303 | A | 6/1980 | Ricks |
| 4,221,558 | A | 9/1980 | Santisi |
| 4,239,481 | A | 12/1980 | Morck, Jr. |
| 4,252,070 | A | 2/1981 | Benedick |
| 4,289,475 | A | 9/1981 | Wall et al. |
| 4,321,790 | A | 3/1982 | Vadas et al. |
| 4,361,478 | A | 11/1982 | Gengler et al. |
| 4,379,689 | A | 4/1983 | Morck, Jr. |
| 4,400,356 | A | 8/1983 | McVay et al. |
| 4,403,941 | A * | 9/1983 | Okiura et al. .................. 431/10 |
| 4,416,620 | A | 11/1983 | Morck |
| 4,418,530 | A | 12/1983 | Bodrov et al. |
| 4,442,901 | A | 4/1984 | Zison |
| 4,447,690 | A | 5/1984 | Grever |
| 4,449,918 | A | 5/1984 | Spahr |
| 4,467,610 | A | 8/1984 | Pearson et al. |
| 4,469,176 | A | 9/1984 | Zison et al. |
| 4,472,935 | A | 9/1984 | Acheson et al. |
| 4,487,573 | A | 12/1984 | Gottschlich et al. |
| 4,493,770 | A | 1/1985 | Moilliet |
| 4,509,333 | A | 4/1985 | Nussdorfer et al. |
| 4,509,374 | A | 4/1985 | Sugimoto et al. |
| 4,534,165 | A | 8/1985 | Davis, Jr. et al. |
| 4,643,667 | A | 2/1987 | Fleming |
| 4,646,660 | A | 3/1987 | Bjorkman et al. |
| 4,681,612 | A | 7/1987 | O'Brien et al. |
| 4,688,495 | A | 8/1987 | Galloway |
| 4,733,528 | A | 3/1988 | Pinto |
| 4,741,690 | A | 5/1988 | Heed |
| 4,754,607 | A | 7/1988 | Mackay |
| 4,769,149 | A | 9/1988 | Nobilet et al. |
| 4,779,545 | A * | 10/1988 | Breen et al. .................. 110/212 |
| 4,794,753 | A | 1/1989 | Beebe |
| 4,823,711 | A | 4/1989 | Kroneberger et al. |
| 4,828,481 | A | 5/1989 | Weil et al. |
| 4,838,020 | A | 6/1989 | Fujitsuka |
| 4,838,782 | A | 6/1989 | Wills |
| 4,850,857 | A | 7/1989 | Obermuller |
| 4,864,811 | A | 9/1989 | Pfefferle |
| 4,870,824 | A | 10/1989 | Young et al. |
| 4,874,310 | A | 10/1989 | Seemann et al. |
| 4,888,162 | A | 12/1989 | Brian |
| 4,941,415 | A | 7/1990 | Pope et al. |
| 4,953,512 | A | 9/1990 | Italiano |
| 4,974,530 | A | 12/1990 | Lyon |
| 5,003,773 | A | 4/1991 | Beckwith |
| 5,044,931 | A | 9/1991 | Van Eerden et al. |
| 5,059,405 | A | 10/1991 | Watson et al. |
| 5,108,717 | A | 4/1992 | Deller et al. |
| 5,131,838 | A | 7/1992 | Gensler et al. |
| 5,154,599 | A | 10/1992 | Wunning |
| 5,161,366 | A | 11/1992 | Beebe |
| 5,165,884 | A | 11/1992 | Martin et al. |
| 5,183,401 | A | 2/1993 | Dalla Betta et al. |
| 5,190,453 | A | 3/1993 | Le et al. |
| 5,232,357 | A | 8/1993 | Dalla Betta et al. |
| 5,248,251 | A | 9/1993 | Dalla Betta et al. |
| 5,250,489 | A | 10/1993 | Dalla Betta et al. |
| 5,258,349 | A | 11/1993 | Dalla Betta et al. |
| 5,259,754 | A | 11/1993 | Dalla Betta et al. |
| 5,263,314 | A | 11/1993 | Anderson |
| 5,271,729 | A | 12/1993 | Gensler et al. |
| 5,271,809 | A | 12/1993 | Holzhausen |
| 5,281,128 | A | 1/1994 | Dalla Betta et al. |
| 5,285,123 | A | 2/1994 | Kataoka et al. |
| 5,309,707 | A | 5/1994 | Provol et al. |
| 5,320,518 | A | 6/1994 | Stilger et al. |
| 5,326,253 | A | 7/1994 | Dalla Betta et al. |
| 5,326,537 | A | 7/1994 | Cleary |
| 5,329,757 | A | 7/1994 | Faulkner et al. |
| 5,329,955 | A | 7/1994 | Gensler et al. |
| 5,384,051 | A | 1/1995 | McGinness |
| 5,405,260 | A | 4/1995 | Della Betta et al. |
| 5,406,704 | A | 4/1995 | Retallick |
| 5,425,632 | A | 6/1995 | Tsurumi et al. |
| 5,461,864 | A | 10/1995 | Betta et al. |
| 5,506,363 | A | 4/1996 | Grate et al. |
| 5,511,972 | A | 4/1996 | Dalla Betta et al. |
| 5,512,250 | A | 4/1996 | Betta et al. |
| 5,518,697 | A | 5/1996 | Dalla Betta et al. |
| 5,524,432 | A | 6/1996 | Hansel |
| 5,524,599 | A | 6/1996 | Kong et al. |
| 5,533,890 | A | 7/1996 | Holst et al. |
| 5,557,014 | A | 9/1996 | Grate et al. |
| 5,560,128 | A | 10/1996 | Marega et al. |
| 5,592,811 | A | 1/1997 | Dodge et al. |
| 5,601,790 | A | 2/1997 | Stilger et al. |
| 5,602,298 | A | 2/1997 | Levin |
| 5,635,139 | A | 6/1997 | Holst et al. |
| 5,637,283 | A | 6/1997 | Stilger et al. |
| 5,650,128 | A | 7/1997 | Holst et al. |
| 5,685,156 | A | 11/1997 | Willis et al. |
| 5,697,776 | A | 12/1997 | Van Eerden et al. |
| 5,709,541 | A | 1/1998 | Gensler et al. |
| 5,770,584 | A | 6/1998 | Kucera et al. |
| 5,770,784 | A | 6/1998 | Heywood et al. |
| 5,806,298 | A | 9/1998 | Klosek et al. |
| 5,817,286 | A | 10/1998 | Martin et al. |
| 5,819,524 | A | 10/1998 | Bosley et al. |
| 5,819,673 | A | 10/1998 | Heywood et al. |
| 5,832,713 | A | 11/1998 | Maese et al. |
| 5,842,357 | A | 12/1998 | Siwajek et al. |
| 5,850,731 | A | 12/1998 | Beebe et al. |
| 5,850,733 | A | 12/1998 | Bosley et al. |
| 5,857,419 | A | 1/1999 | Van Eerden et al. |
| 5,862,858 | A | 1/1999 | Wellington et al. |
| 5,895,599 | A | 4/1999 | Nivoche |
| 5,921,763 | A | 7/1999 | Martin |
| 5,944,503 | A | 8/1999 | Van Eerden et al. |
| 6,017,172 | A | 1/2000 | Ukegawa et al. |
| 6,019,172 | A | 2/2000 | Wellington et al. |
| 6,033,207 | A | 3/2000 | Cummings |
| 6,053,699 | A | 4/2000 | Turnquist et al. |
| 6,070,404 | A | 6/2000 | Bosley et al. |
| 6,095,793 | A | 8/2000 | Greeb |
| 6,107,693 | A | 8/2000 | Mongia et al. |
| 6,109,018 | A | 8/2000 | Rostrup-Nielsen et al. |
| 6,116,014 | A | 9/2000 | Dalla Betta et al. |
| 6,141,953 | A | 11/2000 | Mongia et al. |
| 6,158,222 | A | 12/2000 | Retallick |
| 6,164,908 | A | 12/2000 | Nishida et al. |
| 6,205,768 | B1 | 3/2001 | Dibble et al. |
| 6,217,832 | B1 | 4/2001 | Betta et al. |
| 6,226,976 | B1 | 5/2001 | Scott et al. |
| 6,251,347 | B1 | 6/2001 | Campbell et al. |
| 6,257,869 | B1 | 7/2001 | Martin et al. |
| 6,261,093 | B1 | 7/2001 | Matros et al. |
| 6,269,625 | B1 | 8/2001 | Dibble et al. |
| 6,269,882 | B1 | 8/2001 | Wellington et al. |
| 6,313,544 | B1 | 11/2001 | Mongia et al. |
| 6,334,769 | B1 | 1/2002 | Retallick et al. |
| 6,339,924 | B1 | 1/2002 | Hoyer et al. |
| 6,339,925 | B1 | 1/2002 | Hung et al. |
| 6,345,495 | B1 | 2/2002 | Cummings |
| 6,391,267 | B1 | 5/2002 | Martin et al. |
| 6,393,727 | B1 | 5/2002 | Seelig et al. |
| 6,393,821 | B1 | 5/2002 | Prabhu |
| 6,469,181 | B1 | 10/2002 | Gruber et al. |
| 6,487,860 | B2 | 12/2002 | Mayersky et al. |
| 6,497,615 | B1 | 12/2002 | Klager |

(56) References Cited

U.S. PATENT DOCUMENTS

| | | | |
|---|---|---|---|
| 6,521,566 B1 | 2/2003 | Magno et al. |
| 6,539,720 B2 | 4/2003 | Rouse et al. |
| 6,551,068 B2 | 4/2003 | Blotenberg |
| 6,595,001 B2 | 7/2003 | Rautenbach et al. |
| 6,612,112 B2 | 9/2003 | Gilbreth et al. |
| 6,634,176 B2 | 10/2003 | Rouse et al. |
| 6,639,328 B2 | 10/2003 | Wacknov |
| 6,655,137 B1 | 12/2003 | Sardari |
| 6,657,332 B2 | 12/2003 | Balas |
| 6,657,348 B2 | 12/2003 | Qin et al. |
| 6,675,583 B2 | 1/2004 | Willis et al. |
| 6,696,130 B1 | 2/2004 | Kasai et al. |
| 6,698,412 B2 | 3/2004 | Dalla Betta |
| 6,715,295 B2 | 4/2004 | Gadde et al. |
| 6,715,296 B2 | 4/2004 | Bakran et al. |
| 6,718,772 B2 | 4/2004 | Dalla Betta et al. |
| 6,720,685 B2 | 4/2004 | Balas |
| 6,732,531 B2 | 5/2004 | Dickey |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,784,565 B2 | 8/2004 | Wall et al. |
| 6,787,933 B2 | 9/2004 | Claude et al. |
| 6,796,129 B2 | 9/2004 | Yee et al. |
| 6,804,946 B2 | 10/2004 | Willis et al. |
| 6,810,678 B1 | 11/2004 | Luk |
| 6,812,586 B2 | 11/2004 | Wacknov et al. |
| 6,812,587 B2 | 11/2004 | Gilbreth et al. |
| 6,815,932 B2 | 11/2004 | Wall |
| 6,824,328 B1 | 11/2004 | Vinegar et al. |
| 6,832,480 B1 | 12/2004 | Anguil |
| 6,864,595 B2 | 3/2005 | Wall |
| 6,892,542 B2 | 5/2005 | Voinov |
| 6,895,760 B2 | 5/2005 | Kesseli |
| RE38,784 E | 8/2005 | Maese et al. |
| 6,923,001 B2 | 8/2005 | Laster et al. |
| RE38,815 E | 10/2005 | Maese et al. |
| 6,951,110 B2 | 10/2005 | Kang |
| 6,960,840 B2 | 11/2005 | Willis et al. |
| 6,962,055 B2 | 11/2005 | Chen et al. |
| 6,983,605 B1 | 1/2006 | Hook et al. |
| 7,007,486 B2 | 3/2006 | Sprouse et al. |
| 7,007,487 B2 | 3/2006 | Belokon et al. |
| 7,017,329 B2 | 3/2006 | Farhangi et al. |
| 7,045,913 B2 | 5/2006 | Ebrahim et al. |
| 7,053,590 B2 | 5/2006 | Wang |
| 7,062,917 B2 | 6/2006 | Wunning et al. |
| 7,093,445 B2 | 8/2006 | Corr, II et al. |
| 7,096,671 B2 | 8/2006 | Bland et al. |
| 7,117,676 B2 | 10/2006 | Farhangi et al. |
| 7,117,694 B2 | 10/2006 | Braun et al. |
| 7,121,097 B2 | 10/2006 | Yee et al. |
| 7,124,589 B2 | 10/2006 | Neary |
| 7,140,188 B2 | 11/2006 | Hosokawa et al. |
| 7,168,949 B2 | 1/2007 | Zinn et al. |
| RE39,596 E | 5/2007 | Dodge et al. |
| 7,425,127 B2 | 9/2008 | Zinn et al. |
| 7,430,869 B2 | 10/2008 | Su et al. |
| 7,469,647 B2 * | 12/2008 | Widmer et al. ............... 110/345 |
| 2002/0060556 A1 | 5/2002 | Wall |
| 2002/0063479 A1 | 5/2002 | Mitchell et al. |
| 2002/0066270 A1 | 6/2002 | Rouse et al. |
| 2002/0067872 A1 | 6/2002 | Weissert |
| 2002/0069648 A1 | 6/2002 | Levy et al. |
| 2002/0078694 A1 | 6/2002 | Nazeer et al. |
| 2002/0079760 A1 | 6/2002 | Vessa |
| 2002/0084702 A1 | 7/2002 | Balas |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0104316 A1 | 8/2002 | Dickey et al. |
| 2002/0125779 A1 | 9/2002 | Qin et al. |
| 2002/0128076 A1 | 9/2002 | Lubell |
| 2002/0166324 A1 | 11/2002 | Willis et al. |
| 2002/0195031 A1 | 12/2002 | Walker |
| 2003/0102730 A1 | 6/2003 | Balas |
| 2003/0110773 A1 | 6/2003 | Rouse et al. |
| 2003/0111842 A1 | 6/2003 | Gilbreth et al. |
| 2003/0157395 A1 | 8/2003 | Ren et al. |
| 2003/0192318 A1 | 10/2003 | Sprouse et al. |
| 2003/0192319 A1 | 10/2003 | Sprouse et al. |
| 2004/0003598 A1 | 1/2004 | Farhangi |
| 2004/0011523 A1 | 1/2004 | Sarada |
| 2004/0021235 A1 | 2/2004 | Corr et al. |
| 2004/0040312 A1 | 3/2004 | Hoffjann et al. |
| 2004/0074223 A1 | 4/2004 | Willis et al. |
| 2004/0100101 A1 | 5/2004 | Willis et al. |
| 2004/0103669 A1 | 6/2004 | Willis et al. |
| 2004/0119291 A1 | 6/2004 | Hamrin et al. |
| 2004/0129188 A1 | 7/2004 | Traina |
| 2004/0148942 A1 | 8/2004 | Pont et al. |
| 2004/0160061 A1 | 8/2004 | Rouse et al. |
| 2004/0167270 A1 | 8/2004 | Chang et al. |
| 2004/0178641 A1 | 9/2004 | Wall |
| 2004/0219079 A1 | 11/2004 | Hagen et al. |
| 2004/0238654 A1 | 12/2004 | Hagen et al. |
| 2004/0255588 A1 | 12/2004 | Lundberg et al. |
| 2005/0022499 A1 | 2/2005 | Belokon et al. |
| 2005/0076648 A1 | 4/2005 | Farhangi |
| 2005/0196714 A1 | 9/2005 | Carroni et al. |
| 2005/0201909 A1 | 9/2005 | Carroni et al. |
| 2005/0217178 A1 * | 10/2005 | Aoyama ............... 48/127.9 |
| 2006/0016195 A1 | 1/2006 | Dalla Betta et al. |
| 2006/0037432 A1 | 2/2006 | Deevi et al. |
| 2006/0049080 A1 | 3/2006 | Bacha et al. |
| 2006/0052499 A1 | 3/2006 | Chang et al. |
| 2006/0054318 A1 | 3/2006 | Sarada |
| 2006/0063845 A1 | 3/2006 | O'Rear et al. |
| 2006/0063869 A1 | 3/2006 | Chang et al. |
| 2006/0063870 A1 | 3/2006 | Chang et al. |
| 2006/0074134 A1 | 4/2006 | O'Rear et al. |
| 2006/0080968 A1 | 4/2006 | Griffin et al. |
| 2006/0096294 A1 | 5/2006 | Farhangi et al. |
| 2006/0096297 A1 | 5/2006 | Griffin et al. |
| 2006/0138022 A1 | 6/2006 | Miller et al. |
| 2006/0138024 A1 | 6/2006 | Miller et al. |
| 2006/0150635 A1 | 7/2006 | Su et al. |
| 2006/0196807 A1 | 9/2006 | Rosenbaum et al. |
| 2006/0199743 A1 | 9/2006 | Rosenbaum et al. |
| 2006/0202059 A1 | 9/2006 | Carroni et al. |
| 2006/0213183 A1 | 9/2006 | Althaus |
| 2006/0260308 A1 | 11/2006 | Ingersoll |
| 2006/0272331 A1 | 12/2006 | Bucker et al. |
| 2007/0054226 A1 | 3/2007 | Carroni et al. |
| 2007/0240425 A1 | 10/2007 | Malavasi et al. |
| 2008/0222913 A1 | 9/2008 | Ronning et al. |
| 2009/0100820 A1 | 4/2009 | Prabhu |
| 2009/0100821 A1 | 4/2009 | Prabhu |
| 2010/0139282 A1 | 6/2010 | Prabhu |
| 2010/0275611 A1 | 11/2010 | Prabhu |
| 2011/0219780 A1 | 9/2011 | Prabhu |
| 2013/0104563 A1 | 5/2013 | Oelfke et al. |

FOREIGN PATENT DOCUMENTS

| | | |
|---|---|---|
| JP | 11-13483 A | 1/1999 |
| JP | 2003-536364 | 2/2003 |
| WO | WO-96/14370 A2 | 5/1996 |
| WO | WO-01/92702 A1 | 12/2001 |

OTHER PUBLICATIONS

Stadler, H. "Experimental and Numerical Investigation of Flameless Pulverised Coal Combustion" <http://darwin.bth.rwth-aachen.de/opus3/voltexte/2010/pdf/3323.pdf>, Aug. 2010, retrieved Sep. 14, 2011.

* cited by examiner

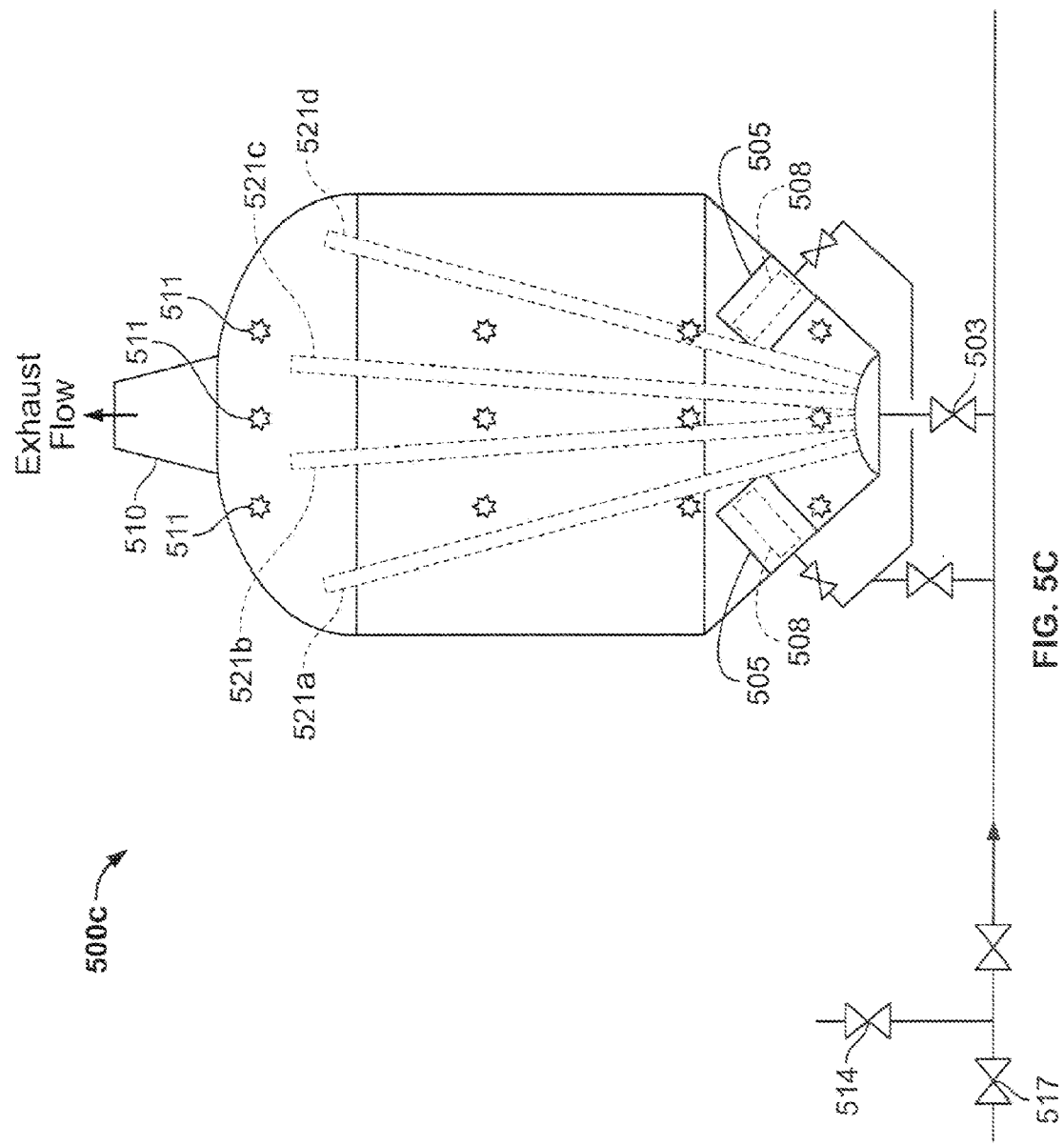

HEATING A REACTION CHAMBER

CROSS-REFERENCE TO RELATED APPLICATIONS

This application is a continuation-in-part of co-pending U.S. application Ser. No. 12/772,622 entitled "Distributing Fuel Flow in a Reaction Chamber," filed May 3, 2010, which claims the benefit of provisional application Ser. No. 61/174,857 entitled "Oxidizer," filed May 1, 2009. The entire contents of both priority documents are incorporated herein by reference.

BACKGROUND

This disclosure relates to heating a reaction chamber, for example, a reaction chamber for oxidizing fuel in a gas turbine system. Some conventional reaction chambers (e.g., thermal oxidizers) are initially heated by using an ignition source to ignite highly-concentrated rich fuels (e.g., highly-concentrated natural gas) in the reaction chamber. In such conventional reaction chambers, after the highly-concentrated rich fuels heat the reaction chamber to a high temperature, low-BTU gas may be destroyed in the hot reaction chamber by oxidizing the low-BTU gas at a high temperature.

SUMMARY

In a general aspect, a region in a reaction chamber is heated to an operating temperature primarily using heat energy released by oxidizing weak fuel in the reaction chamber.

In some aspects, an air/fuel mixture is received in an oxidation reaction chamber. The fuel concentration in the air/fuel mixture is below a lower explosive limit (LEL) concentration of the fuel. The mixture is received while a temperature of a region in the oxidation reaction chamber is below an oxidation temperature sufficient to oxidize the fuel. The temperature of the region is raised to at least the oxidation temperature primarily using heat energy released from oxidizing the air/fuel mixture in the reaction chamber.

Implementations may include one or more of the following features. Raising the temperature of the region includes using a heater to heat another, different region of the reaction chamber to at least the oxidation temperature. Raising the temperature of the region includes generating the heat energy by oxidizing the air/fuel mixture in the other, different region. Raising the temperature of the region includes transferring the heat energy to the region. Transferring the heat energy includes transferring by convection and/or transferring by conduction. Receiving an air/fuel mixture includes receiving a first flow of the air/fuel mixture through a first inlet into the region. A second flow of the air/fuel mixture is received through a second inlet into the other region after heating the other region to at least the oxidation temperature. After turning off the heater, the temperature of the region and/or the temperature of the other region is maintained at least at the oxidation temperature primarily using heat energy released from oxidizing the air/fuel mixture in the reaction chamber. A temperature substantially throughout the oxidation reaction chamber is raised to at least the oxidation temperature primarily using heat energy released from oxidizing the air/fuel mixture in the reaction chamber. The temperature substantially throughout the oxidation reaction chamber is maintained below a temperature that causes formation of nitrogen oxides. Raising the temperature of the region raises a temperature of thermal capacitance material about the region. The air/fuel mixture is received in the oxidation reaction chamber while at least 95 percent of an internal volume of the oxidation reaction chamber is below the oxidation temperature. The received air/fuel mixture cannot sustain a flame. The temperature of the region is raised while an internal pressure of the oxidation reaction chamber is at or below an atmospheric pressure (e.g., two pounds per square inch gauge). The internal pressure of the oxidation reaction chamber is then raised above the atmospheric pressure. The internal pressure is raised to a pressure at which a turbine outputs energy, and oxidation product is communicated from an outlet of the oxidation reaction chamber to an inlet of the turbine.

In some aspects, a system for oxidizing fuel includes an oxidation reaction chamber. The oxidation reaction chamber includes an internal volume that includes a first region and a second, different region. A first inlet into the reaction chamber is arranged to communicate a non-combustible air/fuel mixture into the first region, and a second inlet into the reaction chamber is arranged to communicate a non-combustible air/fuel mixture into the second region. A heater in the first region is arranged to heat the first region to at least an oxidation temperature sufficient to oxidize the fuel of the non-combustible air/fuel mixture. The second region in the reaction chamber is arranged to receive heat energy from oxidizing the fuel in the first region, and the received heat energy raises the temperature of the second region from below the oxidation temperature to at least the oxidation temperature.

Implementations may include one or more of the following features. The system includes a gas turbine having a turbine inlet. An outlet from the internal volume of the reaction chamber is in fluid communication with the turbine inlet. The gas turbine has a turbine outlet. The system includes a blower having a blower inlet in fluid communication with the turbine outlet. The blower is arranged to provide pressure in the internal volume of the reaction chamber. The pressure provided by the blower induces flow from the internal volume into the turbine. The system includes a fuel source having a fuel source outlet in fluid communication with the first fuel inlet and the second fuel inlet. The air/fuel mixture includes methane gas from the fuel source. The system includes a blower in fluid communication with the fuel source outlet and the first inlet and the second inlet. The blower is arranged to provide pressure that communicates the first flow and the second flow into the internal volume of the reaction chamber. The internal volume in the reaction chamber includes additional, different regions. The system includes of additional inlets arranged to communicate air/fuel mixture into the additional regions. Each of the additional regions is arranged to receive heat energy from oxidizing the fuel in at least one of the other regions, which raises the temperature of the additional region from below the oxidation temperature to at least the oxidation temperature. The heater is an electrical heater and/or another type of heater.

The details of one or more embodiments of these concepts are set forth in the accompanying drawings and the description below. Other features, objects, and advantages of these concepts will be apparent from the description and drawings, and from the claims.

DESCRIPTION OF DRAWINGS

FIGS. 5A, 5B, 5C and 5D are diagrams of example reaction chambers.

Like reference symbols in the various drawings indicate like elements.

DETAILED DESCRIPTION

Figure 1:
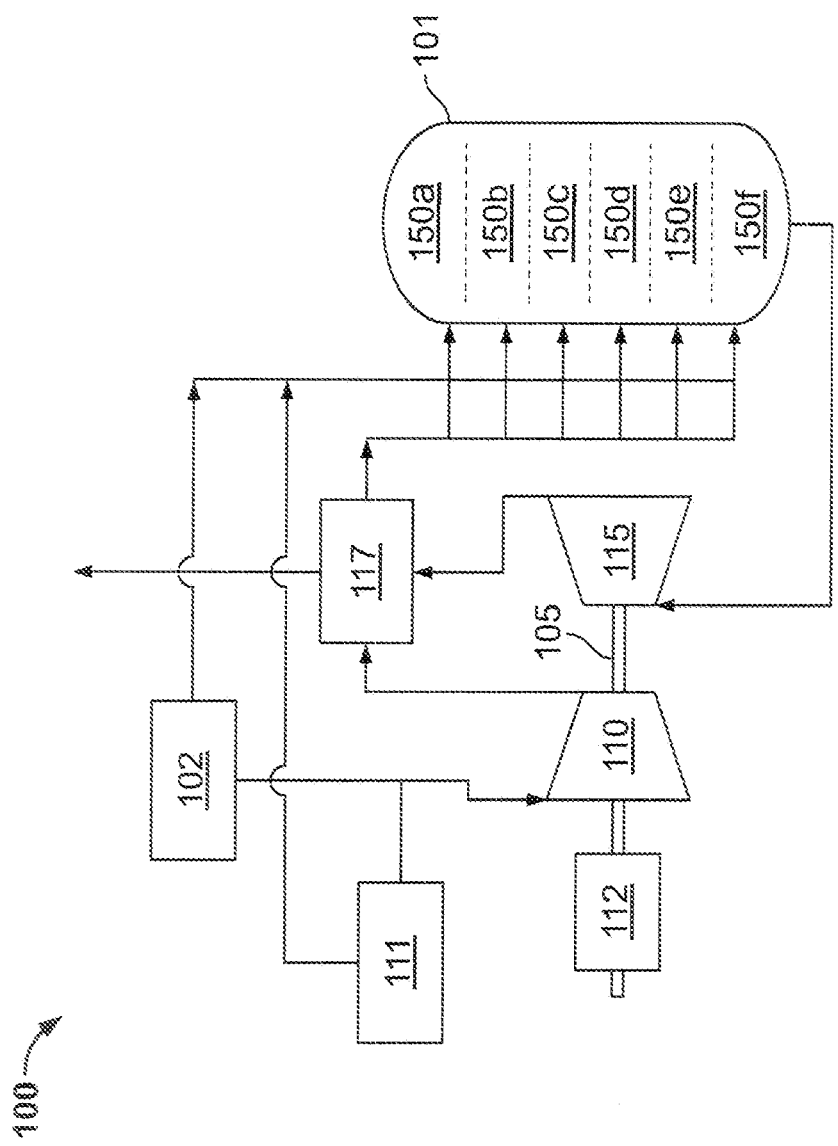
FIG. 1 is a diagram of an example gas turbine system.

FIG. 1 is a diagram of an example gas turbine system 100. The example system 100 can oxidize fuel and use the heat energy released by the oxidation process to generate rotational mechanical energy and/or to generate electrical power. The example gas turbine system 100 can generate energy by oxidizing fuel in a gas mixture. During a heat-up process and/or during sustained operation, the system 100 may oxidize the fuel while reducing or eliminating the production of greenhouse gases and/or other undesirable or harmful materials (e.g., nitrogen oxides (NOx), carbon monoxide (CO), volatile organic compounds (VOCs), and/or other types of potentially harmful gases). For example, temperatures above 2300 degrees Fahrenheit (° F.) may cause nitrogen oxides to form, and the system 100 can reduce or eliminate formation of nitrogen oxides by maintaining a maximum temperature of the fuel below 2300° F. during sustained operation and/or during a heat-up process. As another example, incomplete oxidation of hydrocarbons (e.g., in traditional combustion systems) may cause carbon monoxide to form, and the system 100 can reduce or eliminate production of carbon monoxide by completely or nearly completely oxidizing hydrocarbon fuel to water ($H_2O$) and carbon dioxide ($CO_2$) products. The system 100 may completely oxidize fuel, so that little or no fuel is wasted or emitted into the environment.

In some implementations, the system 100 can heat the reaction chamber 101 to operating temperatures and sustain operation by oxidizing low-concentration fuels, for example, air/fuel mixtures at fuel concentrations that are below the lower explosive limit for the fuel. As such, the reaction chamber 101 may be heated to an operating temperature without requiring use of traditional rich fuels (e.g., highly-concentrated natural gas). Because combustion of highly-concentrated traditional fuels such as natural gas may produce nitrogen oxides (NOx), carbon monoxide (CO), volatile organic compounds (VOCs), and/or other types of potentially harmful gases, by eliminating the combustion of such highly-concentrated fuels during the heating process, the system 100 may reduce emission of potentially harmful gases during the heating process.

The example system 100 includes an air source 111 (e.g., ambient air and/or other air source), a fuel source 102, a compressor 110, a turbine 115, a heat exchanger 117, and a reaction chamber 101. As shown in FIG. 1, the example system may also include a generator 112 (the combination of the turbine 115, compressor 110 and generator 112 being known as a turbine generator). In the example system 100 shown, a shaft 105 mechanically couples the turbine 115 to the compressor 110 and the generator 112. A gas turbine system may include additional, fewer, and/or different components, which may be used in the same and/or a different manner.

The example fuel source 102 provides fuel to the system 100 for heating the reaction chamber 101 and for sustaining an oxidation process in the reaction chamber 101. The example system 100 can utilize fuel that is initially gaseous and/or the system 100 can utilize liquid or solid fuels that can be converted into gas or vapor. The fuel source 102 may provide a single type of fuel and/or multiple different types of fuel, one or all of which may be oxidized in the reaction chamber 101. The fuel source 102 may provide hydrocarbon fuel and/or other types of fuel. The fuel source 102 may provide weak fuel. Weak fuels may include low BTU gases (i.e., low energy per unit mass) and/or fuels having low calorific value. Weak fuels may include gases containing fuels below a concentration that can sustain an open flame and/or other combustion reaction. For example, fuel may be mixed with air with the resultant fuel concentration below a lower explosive limit (LEL) for the fuel. In some instances, introducing such a weak fuel to a spark or flame, even in the presence of air, may snuff out the spark or flame without oxidizing the fuel in the mixture. However, when the weak fuel is raised to a temperature above its auto-ignition temperature, the fuel can oxidize in the presence of air without introduction of a spark or flame. A specific example of weak fuels include gas that is mostly carbon dioxide or nitrogen, containing small quantities of methane, ethane, carbon monoxide, and other types of fuel. Such gas is often emitted from so-called unproductive natural gas wells. The fuel source 102 may provide fuels other than, or in addition to, weak fuels. For example, in some implementations, the fuel source 102 may provide propane, butane, kerosene, gasoline, and/or other types of fuels in addition to, or instead of, weak fuels. In some cases, the fuel source 102 may provide hydrogen fuel.

The fuel source 102 may include gas emanated from a landfill, which may contain only a small percentage of methane fuel (e.g., 3 percent). A gas having such a low concentration of methane may be below a lower explosive limit. The lower explosive limit (LEL) of a fuel may refer to the lowest concentration of the fuel in air capable of producing a flash of fire in presence of an ignition source. Concentrations lower than the LEL are typically too weak for combustion. Different types of fuel have different LEL values, typically in the range of approximately 1 percent to 5 percent by volume, although some fuels have an LEL outside of this approximate range. Some particular examples of LEL values are (approximately, on a volumetric basis) 3 percent for ethane, 4 percent for hydrogen, 5 percent for methane, and 2 percent for propane.

Fuel from the fuel source 102 can be a natural (e.g., non-anthropological) fuel source or a human-made (e.g., anthropological) fuel source. For example, the fuel source 102 may provide methane from cattle belches, a swampland, a rice farm, and/or methane produced by fermentation of organic matter. Other example fuel sources can include manure, municipal waste, wetlands, gas seeping from leaks in the system 100 or other systems, and drilling and recovery operations. In some implementations, the fuel source 102 includes a gasifier that generates gaseous fuel from solids. In some implementations, the fuel source 102 includes fuel mixed with water, and fuel from the fuel source 102 includes water vapor. One or more supplemental fuel sources may also be utilized by the system 100.

The example air source 111 provides air for oxidation processes in the reaction chamber 101. Hydrocarbon fuels are oxidized when they are heated above their auto-ignition temperature in the presence of oxygen. The air source 111 provides gas containing oxygen, which is mixed with the fuel from the fuel source 102 prior to oxidizing the fuel. The air source 111 can provide air from the atmosphere surrounding the system 100. The air source 111 can provide air from a tank or cylinder of compressed or non-compressed air. Air from the air source 111 may contain oxygen at any concentration sufficient for the oxidation of the fuel. Air from the air source 111 may include other gases in addition to oxygen gas. For example, the air may include nitrogen, argon, and/or other reactive or non-reactive gases.

Air from the air source 111 may be mixed with fuel from the fuel source 102, and the resulting air/fuel mixture may be communicated to the compressor 110 and/or directly into the reaction chamber 101. The air/fuel mixture may be a low-concentration mixture, for example, below the LEL. For example, even when the fuel source 102 provides a highly-concentrated fuel or a strong fuel, the fuel may be mixed with air from the air source 111 to reduce the concentration of the fuel in the mixture below the LEL.

The system may additionally include a mixer (not shown) that can mix the air and fuel. The air/fuel mixture may be a homogeneous mixture, where the fuel is uniformly distributed through the mixture, or the air/fuel mixture may be a non-homogeneous mixture. The air may be mixed with the fuel without using a mixer device. For example, the air/fuel mixture may be formed in a conduit by injecting the fuel into a stream of air. In some examples, the air and fuel may be mixed at additional and/or different points in the system 100. For example, air from the air source 111 may be combined with the fuel between the compressor 110 and the reaction chamber 101 before or after the fuel is pre-heated by the heat exchanger 117. As another example, air from the air source 111 may be combined with the fuel upon entering the reaction chamber 101. In some instances, the reaction chamber 101 may include an air inlet that introduces air from the air source 111 directly into the reaction chamber 101. In some implementations, the air may be introduced into the reaction chamber 101 as a control flow, for example, to cool regions of high temperature in the reaction chamber 101.

The example compressor 110 receives the air/fuel mixture through a compressor inlet, compresses the received air/fuel mixture, and communicates the compressed air/fuel mixture through a compressor outlet. It is known that mixtures of air and fuel in certain concentrations, especially when pressurized, can be explosive. For fuels that are already very weak, this is not a concern. If the incoming fuel is a rich fuel, it must be diluted with air such that it is well below the threshold of explosiveness. However, diluting the fuel may be easily accomplished, for example, because fuel and air can be mixed prior to compression in the example system 100. Furthermore, the concentration of fuel needed to achieve the temperatures of operation of modern turbines is already well below the explosive threshold, thus safe operation and practical operation go hand in hand in the example system shown in FIG. 1. The compressor 110 may receive mechanical rotational energy from the turbine 115 through the shaft 105. The compressor 110 can utilize the mechanical rotational energy from the turbine 115 to increase the pressure of the air/fuel mixture in the compressor 110. In some implementations, the system 100 may include a compressor that operates in a different manner.

The example shaft 105 transfers rotational energy from the turbine 115 to the compressor 110 and the generator 112. In some implementations, the shaft 105 may include multiple shafts. For example, a first shaft may transfer energy from the turbine 115 to the compressor 110, and a second shaft may transfer energy from the turbine to the generator 112.

The heat exchanger 117 can pre-heat the air/fuel mixture. The example heat exchanger 117 receives the compressed air/fuel mixture from the compressor 110, pre-heats the compressed air/fuel mixture, and communicates the heated, compressed air/fuel mixture to the reaction chamber 101. The heat exchanger 117 may also receive exhaust gas from the turbine 115. The heat exchanger 117 may use heat from the exhaust gas to pre-heat the compressed air/fuel mixture. For example, the exhaust gas and the air/fuel mixture may contact opposite sides of a heat-transfer structure while flowing through the heat exchanger 117. The heat-transfer structure may conduct thermal energy from the higher temperature exhaust gas to the lower temperature air/fuel mixture. In some implementations, the system 100 may include a heat exchanger that operates in a different manner. For example, the system 100 may pre-heat the air/fuel mixture using heat from a different source, or the system 100 may communicate the air/fuel mixture into the reaction chamber 101 without pre-heating the mixture.

The reaction chamber 101 retains the air/fuel mixture as the fuel from the fuel source 102 oxidizes. Example reaction chambers are shown in FIGS. 2, 3, 4, 5A, 5B, 5C, and 5D. The example reaction chamber 101 shown in FIG. 1 may include the same, different and/or additional features. Oxidation of the fuel in the reaction chamber 101 may be initiated by raising the fuel to or above an auto-ignition temperature of the fuel. The system 100 may initiate oxidation in the reaction chamber 101 independent of oxidation catalyst materials (e.g., platinum) and/or independent of an ignition source (e.g., a flame or spark). Fuel may be oxidized in the reaction chamber 101 without raising the temperature of the air/fuel mixture above a threshold temperature, for example, by maintaining the maximum temperature of the fuel in the reaction chamber below the threshold temperature. The threshold temperature may be determined based on one or more factors, for example, the threshold temperature can be a recommended or maximum operating temperature of the turbine, a recommended or maximum inlet temperature for the turbine, a temperature that causes formation of nitrogen oxides, the flow rate of the fuel through the reaction chamber 101, and/or other factors. In some implementations, the threshold temperature can be below the lowest or the highest of a recommended or maximum operating temperature of the turbine, a recommended or maximum inlet temperature for the turbine, a temperature that causes formation of nitrogen oxides, the flow rate of the fuel through the reaction chamber 101, and/or other factors. In some implementations, fuel is oxidized in the reaction chamber 101 below a temperature that causes formation of nitrogen oxides. As such, the reaction chamber 101 can oxidize virtually all of the fuel while producing only minimal amounts of nitrogen oxides. For example, exhaust gas from the system 100 may include less than one part per million each of nitrogen oxide, VOCs and CO, and may even reduce the concentrations of VOCs and CO contained in the incoming air.

The reaction chamber 101 may include an internal volume lined with insulating refractory material. High temperature heat-absorbing and/or heat-resistant material, such as ceramic or rock, called fill material, may be provided in the reaction chamber 101. The thermal capacitance material may have a thermal mass that facilitates slow oxidation of weak fuels flowing through the reaction chamber 101. The thermal mass may help stabilize temperatures for gradual oxidation of the fuel by transmitting heat to the incoming gases and receiving heat from the oxidized gases. In some cases, the thermal mass of thermal capacitance materials in the reaction chamber 101 may act as a dampener, absorbing heat and preventing excessive temperatures that could damage the turbine and/or produce unwanted byproducts (e.g., nitrogen oxides, carbon dioxides, volatile organic compounds and/or others). In some cases, the thermal mass of the thermal capacitance materials in the reaction chamber 101 may provide a temporary source of heat energy, which may help sustain oxidation of the fuel.

The volume and shape of the reaction chamber 101, and the configuration of the overall system, can be designed to provide a controlled flow and flow rate through the chamber, allowing sufficient dwell time for complete fuel oxidation. The flow path can be sufficiently long that a flow rate of the air and fuel mixture along the flow path, averaged over the length of the flow path, allows the fuel to oxidize to completion. As an example, the average dwell time of the gas in the chamber can be greater than one second in some cases. The average dwell time of the gas in the chamber can be less than one second in some cases. The rate of oxidation of the mixture is a function of the constituents of the fuel, fuel concentration, oxygen concentration, pressure, temperature and other factors. Thus, the rate of oxidation can be adjusted by adjusting these parameters accordingly. The reaction chamber 101 may also include one or more sensors for detecting properties such as temperature, pressure, flow rate, or other properties relevant to the startup and/or operation of the gas turbine system 100. The reaction chamber 101 may also include internal structures and/or devices that control aspects of the oxidation process. For example, the reaction chamber 101 may include flow diverters, valves, and/or other features that control temperature, pressure, flow rate, and/or other aspects of fluids in the reaction chamber.

Generally, the reaction chamber 101 may have any geometry and/or orientation, and may include reaction chamber inlets and reaction chamber outlets at any set of locations. Moreover, the reaction chamber may define a primary direction of fuel flow through the reaction chamber (e.g., from one or more air/fuel inlet locations to an outlet from the reaction chamber). For example, fuel may flow through a reaction chamber primarily in an upward direction, primarily in a downward direction, primarily in any intermediate direction, and/or primarily at any angle.

Better dispersion of the air/fuel mixture through the reaction chamber 101 generally increases the likelihood of full oxidation of the fuel. The air/fuel mixture must typically be heated for the fuel to be oxidized, drawing heat from the reaction chamber. Oxidation of the fuel increases the gas temperature within the reaction chamber and in turn imparts heat to the reaction chamber; thus, promoting heating of the air/fuel mixture and oxidizing of the fuel. Increased dispersion of the mixture helps keep local temperatures in the reaction chamber within desired ranges. The reaction chamber 101 may include a gas distributor system that distributes the inflow of the air/fuel mixture into the reaction chamber. In some instances, a fuel distributor system can communicate the air/fuel mixture from a reaction chamber inlet to multiple locations distributed along a flow path through the interior of the reaction chamber.

The interior volume of the reaction chamber 101 may include one or more oxidation regions where air/fuel mixture is oxidized in the reaction chamber 101. Six example regions 150a, 150b, 150c, 150d, 150e, and 150f are shown schematically in the example reaction chamber 101 in FIG. 1. The regions may be defined by the locations of heaters, the locations of flow inlets and/or flow outlets in the reaction chamber, and/or by the internal geometry of the reaction chamber 101. A fuel distributor system in the reaction chamber 101 may define one or more of the regions. For example, the fuel distribution system may include a sparger or distribution conduit having fuel inlets that communicate an air/fuel mixture directly into one of the regions. One or more of the regions may include a heater, while other regions do not. The internal features of the reaction chamber 101 may be designed to permit bulk fluid and heat flow between adjacent regions in the reaction chamber 101.

One or more of the regions 150a, 150b, 150c, 150d, 150e, 150f in the reaction chamber 101 may be heated by fuel oxidation in another one of the regions during a heating process. For example, a first region 150a may be heated by a heater in the first region 150a before the other regions are heated. One or more of the regions 150b, 150c, 150d, 150e, 150f may be heated by heat energy released from oxidation of low-concentration fuel in the region 150a. For example, the region 150b may receive heat energy from oxidation of fuel in the first region 150a. As such, the oxidation of low-concentration fuel in the first region 150a may be the primary source of heat energy that raises the temperature of the second region 150b to an operating temperature. The third region 150c may subsequently be heated based on oxidation of fuel in the second region 150b. The other regions 150d, 150e, 150f may then be heated in a similar manner, based on heat energy from oxidation in another region. One or more of the regions 150c, 150d, 150e, 150f may be heated by a heater, as the first region 150a. For example, the third region 150c may be heated by a heater before, after, or at the same time that the region 150a is heated by a heater, and low-concentration fuel may be oxidized in the region 150c to heat one or more of the other regions (e.g., 150d, 150e, 150f). In some cases, one or more of the regions in the reaction chamber are heated simultaneously or in a different order.

The reaction chamber 101 may include one or more fuel inlets. Fuel inlets may be defined in a fuel distribution structure disposed within the internal volume of the reaction chamber 101, and/or fuel inlets may be defined in a structure or liner surrounding the internal volume of the reaction chamber 101. The fuel inlets each communicate an air/fuel mixture into the reaction chamber. In some instances, each fuel inlet communicates the air/fuel mixture directly into one of the regions 150a, 150b, 150c, 150d, 150e, 150f. The fuel inlets may receive an air/fuel mixture including fuel from the fuel source 102 that has not been compressed or pre-heated. Additionally or alternatively, the fuel inlets may receive an air/fuel mixture that has been pre-heated by the heat exchanger 117 and/or compressed by the compressor 110.

The reaction chamber 101 includes one or more outlets that communicate oxidized fuel and/or other materials to the turbine 115. During a heating process and/or during sustained operation, the gas exiting the reaction chamber 101 through the outlets may include completely oxidized fuel products, non-reactive gases, and only trace amounts of nitrogen oxides and carbon dioxide. In some instances, the gas exiting the reaction chamber 101 through the outlets may include more than trace amounts of unoxidized fuel, nitrogen oxides, carbon dioxide, and/or other materials.

The turbine 115 converts energy of the oxidation product gas to rotational mechanical energy. The example turbine 115 receives the oxidized fuel through a turbine inlet, expands the oxidized fuel between the turbine inlet and a turbine outlet, and communicates the expanded gas through the turbine outlet. The turbine 115 may transmit mechanical rotational energy to the compressor 110 through the shaft 105. The turbine 115 may transmit mechanical rotational energy to the generator 112 through the shaft 105. In some implementations, the system 100 may include a turbine that operates in a different manner.

The generator 112 converts rotational energy from the turbine 115 to electrical energy. For example, the generator 112 can output electrical power to a power grid or to a system that operates on electrical power. In some implementations, the generator 112 may provide mechanical energy to the compressor 110 during startup. For example, the generator may be capable of operating in a motoring mode that converts electrical power to mechanical energy. In some instances, the system 100 may operate without providing energy to the generator 112. For example, the system 100 may operate as a thermal oxidizer to destroy fuel and/or other materials independent of outputting power.

In some aspects of operation of the example system 100, the reaction chamber 101 is initially in a non-reactive state. For example, the temperature inside the reaction chamber 101 is initially below an oxidation temperature, i.e., a temperature sufficient to oxidize fuel. In some cases, one or more regions in the reaction chamber 101 are heated to the oxidation temperature by oxidizing the fuel of a low-concentration air/fuel mixture in other regions within the reaction chamber 101. For example, after the first region 150a is heated to the oxidation temperature by a heater, an air/fuel mixture having a low concentration of fuel may then be oxidized in the first region 150a. The oxidation process in the first region 150a may serve as a primary source of heat energy that raises the temperature of the second region 150b to at least the oxidation temperature. An air/fuel mixture may then be communicated into and oxidized in the second region 150b. One or more of the other regions 150c, 150d, 150e, 150f may be heated in a similar manner, based on oxidation reactions in the first region 150a, the second region 150b, and/or another region. Alternatively, one or more of the other regions 150c, 150d, 150e, 150f may be heated by a heater, as region 150a. After the reaction chamber 101 has reached a reactive state, the pressure in the reaction chamber 101 can be increased, so that the output of the reaction chamber 101 drives the turbine 115 to output energy. In some implementations, one or more of the other regions 150c, 150d, 150e, 150f remains below the oxidation temperature even when the reaction chamber 101 has reached an operating state.

In some aspects of operation of the example system 100, the reaction chamber 101 operates in a reactive state. The fuel source 102 supplies fuel and the air source 111 provides air to form an air/fuel mixture. The air/fuel mixture is communicated into the compressor 110. The compressor 110 compresses the air/fuel mixture and communicates the compressed air/fuel mixture to the heat exchanger 117. The heat exchanger 117 heats the compressed air/fuel mixture and communicates the heated mixture to an inlet of the reaction chamber. The fuel is heated and oxidized in the reaction chamber 101. Output gas, which includes the oxidation product gas, is communicated through the reaction chamber 101 to a reaction chamber outlet to the turbine 115. The oxidation product gas drives the turbine 115, and the turbine 115 communicates the oxidation product gas to the heat exchanger 117. The oxidation product gas provides heat energy to the heat exchanger 117 and exits the system, for example, through an exhaust stack. The oxidation product gas may be cooled with gas (e.g., air and/or another gas or liquid) applied to the oxidation product prior to the turbine. In certain instances, the oxidation product gas may be cooled to prevent overheating the turbine.

Fluid communication through the system 100, for example between the components shown in FIG. 1, may be measured by sensors and/or monitoring devices, may be controlled and/or regulated by control valves and other types of flow control devices, and/or may be contained by conduits, pipes, ports, chambers, and/or other types of structures. As such, the system 100 may include additional devices, structures, subsystems not specifically shown in FIG. 1. The reaction chamber 101 may be operated at, above or below atmospheric and/or the ambient pressure around the exterior of the chamber 101. The reaction chamber 101 may be started up at low pressures after which pressures may be raised as desired. Control subsystems may be tuned to adjust to flow, viscosity and other changes that accompany pressure changes. Similarly, the reaction chamber 101 could be shut down by first depressurizing in a stable manner followed by flow and other curtailments.

Figure 2:
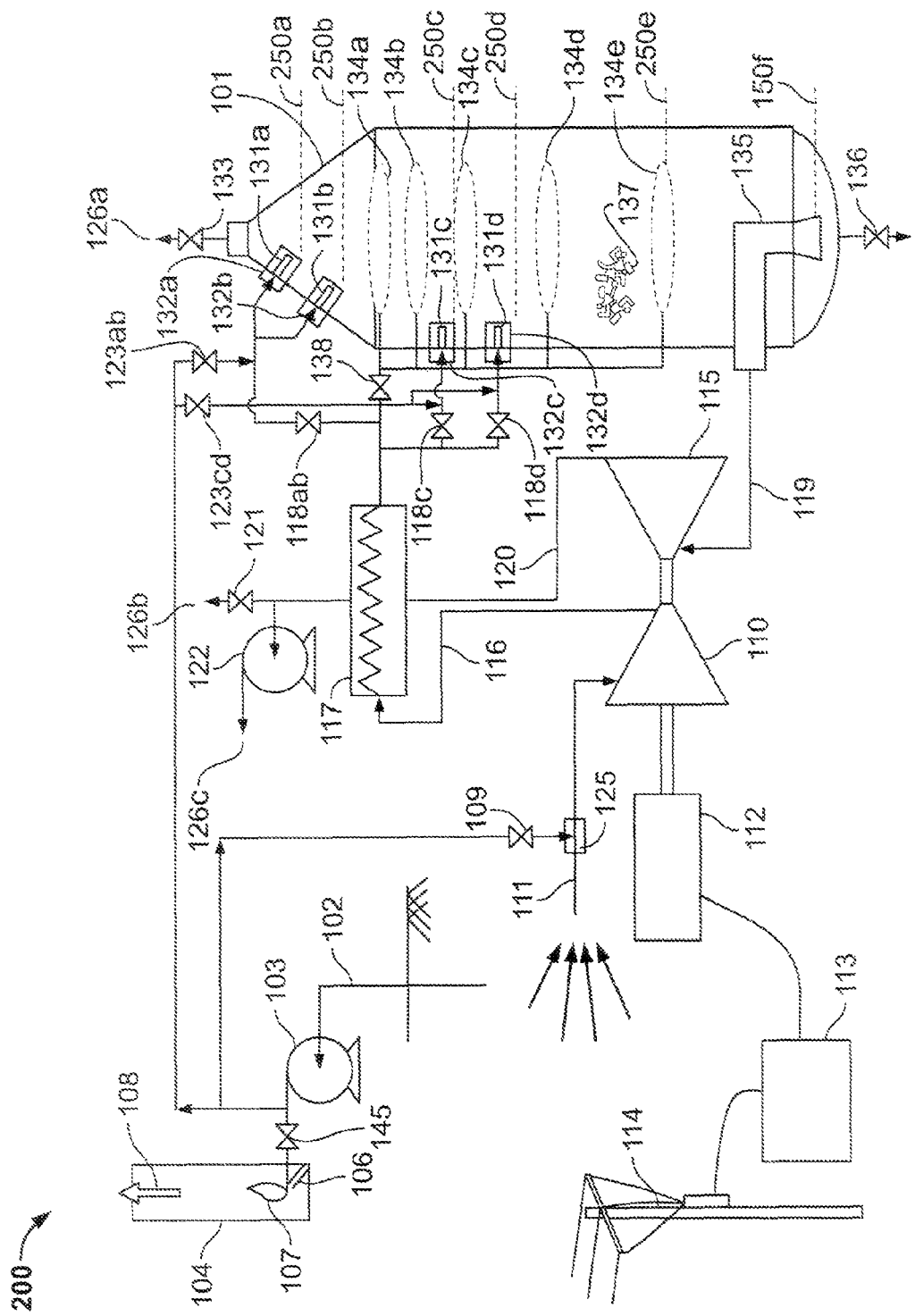
FIG. 2 is a diagram of a fuel processing system.

FIG. 2 is a diagram of an example fuel processing system 200. The example fuel source 102 can receive gas from a landfill, digester, oilfield waste gas or other system. The fuel gas quality may be weak, strong, and/or of variable energy content. In the example system shown in FIG. 2, as a safety measure, when the reaction chamber 101 is not in service, the fuel may be communicated to a flare system via a blower 103. The flare 104 may dispose of (e.g., destroy) the fuel by flaring the fuel. The flare 104 typically includes an ignition source 106, a flame 107, an input control valve 145 and an output vent 108. In some instances, the blower 103 delivers gas at a pressure of 2.0 psig.

Gas from the blower 103 may also be delivered to the reaction chamber 101 via valves 123ab and 123cd. The gas delivered through the valves 123ab, 123cd is mixed with air delivered through valves 118ab, 118c, 118d prior to entering the reaction chamber 101. The system 100 further includes a compressor 110, a turbine 115, a generator 112, an electric power system interface 113, and an electrical power system 114. The air source 111 may deliver the air to an air/fuel mixing chamber 125, and fuel may be delivered to the air/fuel mixing chamber 125 through a valve 109. An air/fuel mixture from the mixing chamber 125 may be delivered to the compressor 110.

Multiple levels 250a, 250b, 250c, 250d, 250e, 250f in the example reaction chamber 101 are labeled in FIG. 2. The example reaction chamber 101 includes inlet ports at levels 250a, 250b, 250c, 250d. Each port includes an air/fuel inlet 131a, 131b, 131c, 131d and a heater 132a, 132b, 132c, 132d, which may be an electric heater or another type of heater. The example reaction chamber 101 is partially or fully filled with porous material 137 such as ceramic that can withstand high temperature and/or absorb and retain heat, thus acting as a temperature stabilizer. The example reaction chamber 101 also includes a gas outlet pipe 135, a vent controlled by valve 133, and a drain controlled by valve 136.

The system 100 includes five fuel distributors 134a, 134b, 134c, 134e, 134f disposed inside the reaction chamber 101. Each of the fuel distributors 134a, 134b, 134c, 134e, 134f is arranged to communicate an air/fuel mixture into a region that is spaced apart from the heaters 132a, 132b, 132c, 132d in the reaction chamber 101. In the example shown, compressed air or a compressed air/fuel mixture flows from the compressor 110 into the heat exchanger 117. In some instances, heated, compressed air flows from the heat exchanger 117 through the valves 118ab, 118c, 118d, to the inlets 131a, 131b, 131c, 131d, and into regions about the heaters 132a, 132b, 132c, 132d in the reaction chamber 101. In some instances, a heated, compressed air/fuel mixture flows from the heat exchanger 117 through the valve 138, into the regions about the fuel distributors 134a, 134b, 134c, 134e in the reaction chamber 101.

Exhaust from the reaction chamber 101 may exit the reaction chamber 101 through the vent controlled by the valve 133 or through the gas outlet pipe 135. From the gas outlet pipe 135, the exhaust flows to an inlet of the turbine 115 through turbine inlet pipe 119. After expanding in the turbine 115, the exhaust exits the turbine 115 through a turbine outlet. From the turbine outlet, the exhaust flows through a turbine exhaust line 120 to the heat exchanger 117 and into the atmosphere through an outlet valve 121. In the example shown, emissions monitors 126a, 126b and 126c are located at points where exhaust gas is emitted into the atmosphere. The monitors can read the amounts of emissions, for example, VOCs, hydrocarbons, NOx and CO, and/or other data. The information may be analyzed to help better manage the oxidation process. In some implementations, a blower 122 is in fluid communication with the turbine exhaust line 120 downstream of heat exchanger 117. The blower 122 may provide back pressure that induces flow through the reaction chamber 101.

In some aspects of operation, when the reaction chamber 101 is heated, the interior of the reaction chamber 101 is initially at ambient temperature and pressure (e.g., a temperature of approximately 60° Fahrenheit and an absolute pressure of approximately 14.7 psi). In this initial configuration, the valves 118ab, 118c, 118d are closed, the valve 133 controlling the vent is open, the valve 136 controlling the drain is closed, the valve 138 controlling flow to the fuel distributors 134a, 134b, 134c, 134d, 134e is open, the valve 109 to the mixing chamber 125 is closed, the valve 145 to the flare 104 is open, and the flare 104 may be operating. In this initial configuration, the compressor 110 and turbine 115 are running, powered by the generator 112 acting as a motor at low speed, such that the compressor 110 discharge pressure is low (e.g., below 1 psig). In the initial configuration with the valve 109 closed, air from the air source 111 (but no fuel from the fuel source 102) enters the compressor 110. Although many other types of fuel may be used, in some examples, fuel from the fuel source 102 includes a mixture of methane, carbon dioxide and nitrogen. In some examples, the nitrogen content may stay fixed at 30 percent by volume, and the methane content may vary between 4 percent and 8 percent by volume, with the remaining volume being carbon dioxide. A mixture that contains only 4 percent methane as its fuel is too weak to combust, and it is very difficult, if not impossible, to sustain a flame with an 8 percent methane concentration. Thus, a gas mixture containing methane in these low concentrations typically cannot be ignited with a spark or glow plug in the presence of air.

Continuing the description of the example heat-up process, air from the air source 111 flows through the compressor 110, through the pipe 116, through the heat exchanger 117, through the valve 138, into the reaction chamber 101, and exits the reaction chamber 101 through the valve 133. The heaters 132a, 132b are turned on, and the temperature in the immediate vicinity of the heaters begins to rise. When the temperature in the regions about the heaters 132a, 132b (e.g., inside and/or about the annular space of an annular heater) exceeds the temperature of auto-oxidation temperature of most hydrocarbons (e.g., above 1,400° F.), other regions inside the reaction chamber may be heated by oxidizing fuel in the heated region about the heaters 132a, 132b. Thus, valve 138 is closed and valve 118ab is opened slightly to allow a small amount of air to flow through. Then, valve 123ab is opened and regulated such that the air-fuel mixture entering the reaction chamber 101 through the inlets 131a, 131b is maintained at 1.5 percent to 3.0 percent methane by volume. Concentrations in this range may ensure availability of sufficient oxygen to oxidize all methane entering the reaction chamber 101 through the inlets 131a, 131b. The oxidation process may release heat in the range of 400° F. to 500° F. per percent of methane in the mixture. Thus, oxidizing a methane concentration of 3.0 percent may raise the temperature by 1,200 to 1,500° F. Theoretically, the temperature of oxidized the gas after exiting the inlets 131a, 131b would range from 2600 to 2900° F. However, the actual temperatures may be somewhat lower because the gases flowing through the heater may tend to cool the heater initially. Also, once the gases begin to oxidize the heater itself may reduce its heat input. As a result of oxidizing the fuel in the region about the heaters, a hot gas heats up the fill material 137 in the vicinity of the heaters 132a, 132b. As the local areas around heaters 132a, 132b heat up, the flow and concentration of the mixture communicated through inlets 131a, 131b can be changed to continue the heat up safely and steadily. A similar process can also be applied to the inlets 131c, 131d through the valves 118c, 118d, and 123cd. In this manner, heat energy released by oxidation of low-concentration fuels (e.g., below the LEL of the fuel) in the regions about the heaters 132a, 132b, 132c, and 132d may be used to heat substantially the entire remaining internal volume of the reaction chamber 101. Thus, in some implementations, the regions about the fuel distributors 134a, 134b, 134c, 134d, 134e are heated by fuel oxidation outside of those regions.

After oxidizing fuel in the region about the heaters 132a, 132b, levels 250a, 250b in the reaction chamber 101 may be sufficiently hot. As such, the valve 133 may be closed, and gas in the reaction chamber 101 may be channeled into the turbine 115 through outlet pipe 135 and turbine inlet pipe 119. As the reaction chamber heats up, flow into the reaction chamber through the inlets 131a, 131b, 131c, 131d may be increased until substantially the entire reaction chamber 101 (e.g., over 90 percent of the internal volume) has reached an operating temperature (e.g., 1400° F.). As the flow is increased, methane concentration may be varied, for example, between 1.5 percent and 3 percent by volume.

After the reaction chamber 101 has reached an operating temperature, the turbine and compressor speeds may be increased, which increases the air flow into the reaction chamber 101. Also, pressure inside the reaction chamber 101 may increase with the increase in turbine speed. During this initial increase in pressure, fuel flow may be controlled by valves 123ab and 123cd. When the air pressure in the reaction chamber 101 approaches the pressure at which the blower 103 delivers fuel gas (e.g., 2.0 psig), additional fuel may be needed. Thus, before the air pressure in the reaction chamber 101 reaches the output pressure of the blower 103, the fuel source 102 may be transitioned to valve 109, which delivers fuel to the inlet of the compressor 110. In the example shown, the inlet of the compressor 110 remains at atmospheric pressure during operation. After the reaction chamber 101 has reached an operating temperature, the valve 138 may be opened to communicate the pressurized air/fuel mixture into the reaction chamber 101 through the fuel distributors 134a, 134b, 134c, 134d, 134e. For example, at approximately the time of transitioning the fuel source 102 to the valve 109, the valve 138 may be opened, while keeping valves 123ab and 123cd open. Because substantially the entire reaction chamber is at or above the oxidation temperature of the fuel (e.g., 1400° F.), substantially all fuel inside the reaction chamber may be oxidized. The emissions monitors 126a, 126b and 126c can help ensure that the process does indeed oxidize the fuel to completion. NOx formation can be reduced or minimized by keeping the maximum temperature inside the reaction chamber below the oxidation temperature for nitrogen, which is 2300° F.

Figure 3:
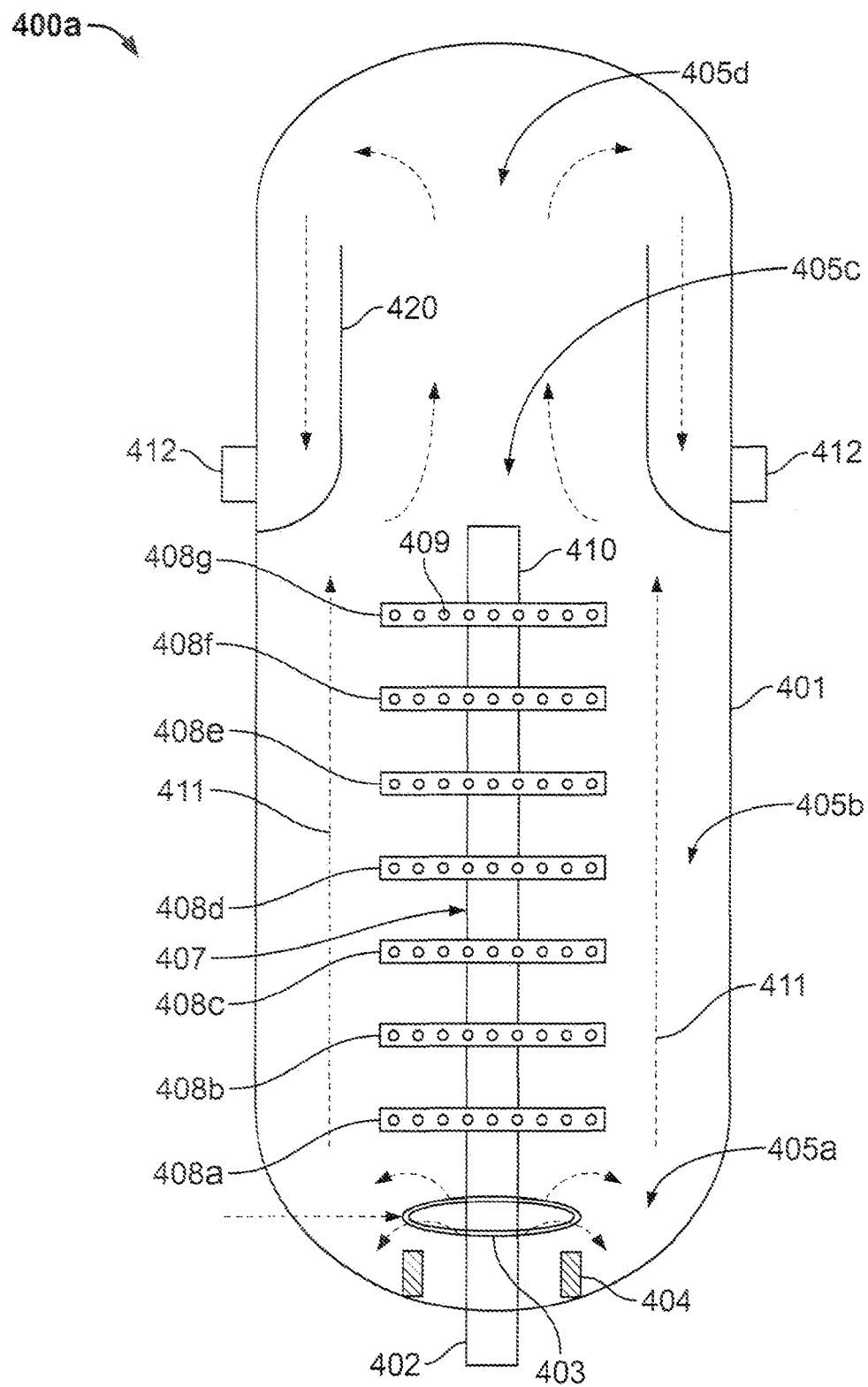
FIGS. 3 and 4 are diagrams of an example reaction chamber.
Figure 4:
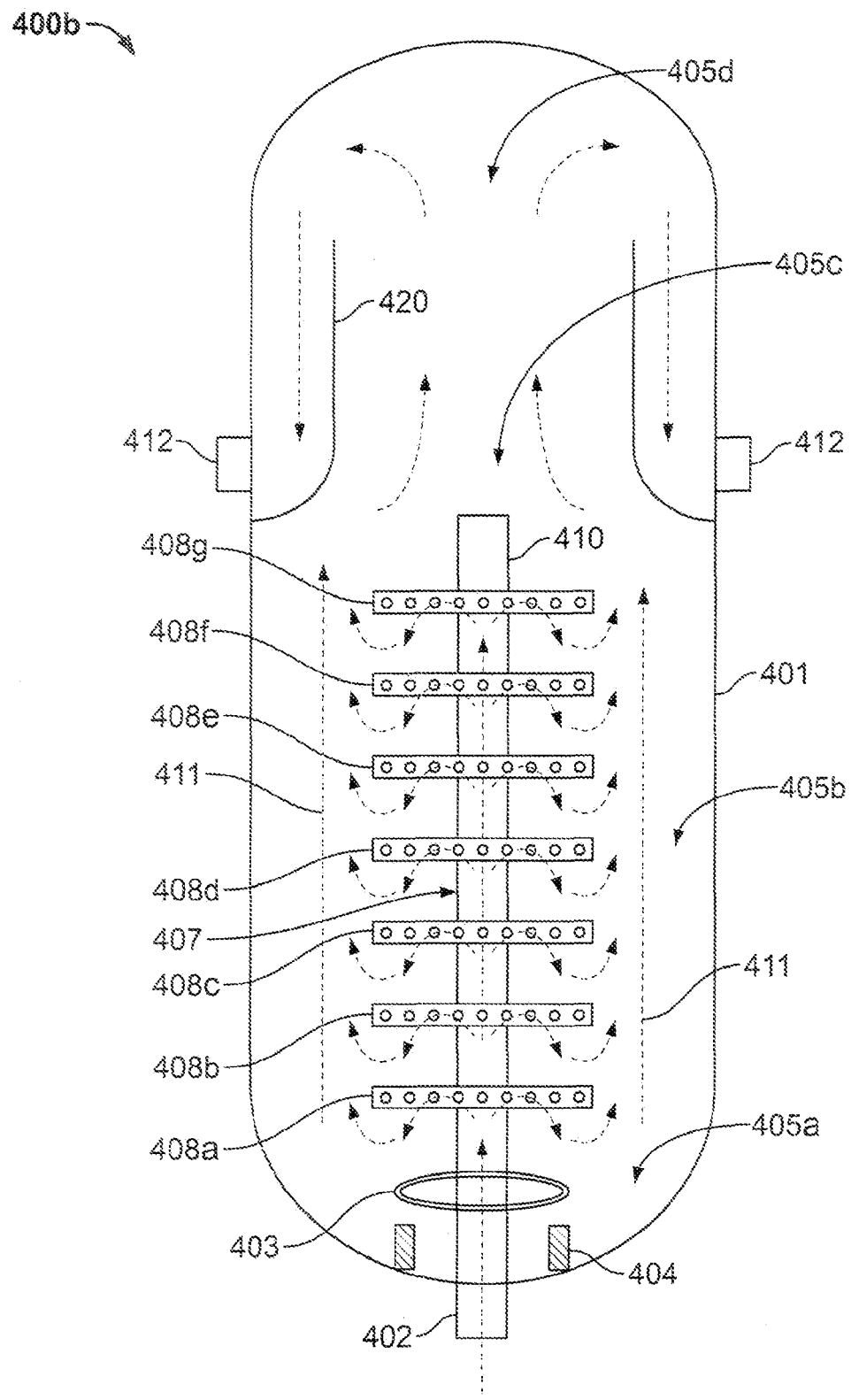

FIGS. 3 and 4 are diagrams of an example reaction chamber 400. For example, the reaction chamber 400 can be used as the reaction chamber 101 of FIG. 1. FIG. 3 shows the reaction chamber 400 operating in a heat-up mode, where fuel flows into the reaction chamber 400 through an air/fuel inlet 403. FIG. 4 shows the reaction chamber 400 operating in a sustained oxidation mode, where a gas distribution system 407 in the reaction chamber 400 distributes fuel into the reaction chamber 400 at multiple locations along a fuel flow path through the reaction chamber 400. The reaction chamber 400 may operate in additional and/or different modes of operation.

The example reaction chamber 400 includes an outer housing 414 that defines an elongate outer structure of the reaction chamber 400. The reaction chamber 400 may include an inner or outer insulating lining 401. The lining 401 may include high temperature resistant materials such as ceramic, rock, fiberglass and/or other types of materials. The inner volume of the reaction chamber may be filled partly or substantially with high temperature resistant ceramic or other fill material that may be in graded sizes and shapes, which may included uniform or non-uniform sizes and shapes. The fill material may be homogeneous or porous, with desired heat absorption, retention and release properties. The example reaction chamber 400 may be provided without a catalyst.

Multiple regions 405a, 405b, 405c, and 405d inside the inner volume of the reaction chamber 400 are labeled in FIGS. 3 and 4 for purposes of discussion. A first region 405a is a volume surrounding the air/fuel inlet 403 at the lower end of the reaction chamber 400. A second region 405b is a volume surrounding the gas distributor system 407. A third region 405c is a volume within the inner radius of the baffle 420 near the upper end of the reaction chamber 400. A fourth region 405d is a volume at the upper end of the reaction chamber 400.

The example reaction chamber 400 includes a gas distributor system 407 within the interior of the reaction chamber 400. Many different types of gas distributor systems may be used. The example gas distributor system 407 is an elongate structure that extends from the lower end of the reaction chamber 400 toward the upper end of the reaction chamber 400. The gas distributor system 407 includes a sparger 410 in fluid communication with the reaction chamber inlet 402. The sparger 410 carries multiple gas distribution arms 408a, 408b, 408c, 408d, 408e, 408f, and 408g (collectively, "arms 408") extending from the sparger 410. The arms 408 each define multiple ports 409 that provide fluid communication into the region 405b surrounding the gas distributor system 407. Gas flow through the region 405b is shown by the arrows 411. The reaction chamber 400 includes a reaction chamber inlet 402 that communicates input gas into the gas distributor system 407 in the interior of the reaction chamber 400. The reaction chamber 400 includes multiple reaction chamber outlets 412 that communicate output gas from the interior of the reaction chamber 400. The reaction chamber 400 may include fewer or additional inlets and/or fewer or additional outlets in additional and/or different locations.

The air/fuel inlet 403 communicates fuel into the region 405a about the heater 404 in the reaction chamber 400. The air/fuel inlet 403 may receive fuel from a fuel source such as the fuel source 102 of FIG. 1. Whereas the gas distributor system 407 distributes fuel at multiple locations along a fuel flow path in the reaction chamber, the air/fuel inlet 403 may communicate fuel into a localized volume about the heater 404 in the reaction chamber 400. The air/fuel inlet 403 shown is a ring shape, but any other distribution shape other than a ring may also be used.

The reaction chamber includes a heater 404 that can be used to heat the fuel in the reaction chamber 400. The heater 404 may be used during the heat-up mode of operation, during a sustained oxidation mode of operation, and/or in other instances. The heater 404 can include an electric heating element, a gas heating element, and/or another type of heating element. The heater 404 may have any geometry accommodated by the reaction chamber 400. The example heater 404 shown in FIGS. 3 and 4 has an annular geometry. The example heater 404 shown in FIG. 3 is an annular structure that surrounds the air/fuel inlet 403 and heats fuel as the fuel is communicated into the region 405a. Fuel from the air/fuel inlet 403 may be oxidized in the region 405a around the air/fuel inlet 403. During the startup mode, oxidation of fuel in the region 405a may serve as a primary source of heat energy for heating the region 405b to an operating temperature. Fuel, oxidation product, and/or other gases may flow from the region 405a to the oxidation zone surrounding the gas distributor system 407.

In one aspect of operation, the reaction chamber 400 is heated during a startup process. An example of a heat-up mode of operation is shown in FIG. 3. In ambient conditions, the interior volume of the reaction chamber 400 is initially too cool to sustain a continuous oxidation process, and the reaction chamber 400 has to be heated to a desired operating condition. Operating the reaction chamber 400 in a heat-up mode may bring the reaction chamber to an internal temperature (and/or pressure) that sustains a continuous oxidation process. Initially, the interior of the reaction chamber 400 may be at an ambient temperature, for example, less than 100 degrees Fahrenheit (° F.). After the heater 404 is turned on, the heater 404 may deliver heat energy at a high temperature. For example, the heater 404 may achieve temperatures in the ranges of 1500° F., 2000° F., and/or higher temperatures.

With the heater 404 turned on, an air/fuel mixture is communicated into the region 405a surrounding the heater 404 through the air/fuel inlet 403. The air/fuel mixture may contain a low concentration of fuel, for example, below the LEL. The heater 404 may heat the fuel to or above an oxidation temperature of the fuel. For example, the auto-oxidation temperature of methane gas is approximately 1000° F., and the heater may heat incoming fuel above 1000° F., for example to 1400° F. When the fuel begins to oxidize in the reaction chamber, the heat energy released by the oxidation reaction heats the region 405a, which in turn heats the fill material in the reaction chamber surrounding the region 405a. The fill material has a high thermal mass and retains the heat energy. Temperatures in the reaction chamber 400 may be monitored by temperatures sensors throughout the reaction chamber 400.

Heat energy from the region 405a and the fill material surrounding the region 405a is transferred downstream in the reaction chamber 400 to the region 405b, for example by conduction and/or convection processes. The region 405b may be heated to the oxidation temperature of the fuel primarily by the oxidation of low concentration fuel in the region 405a. For example, heating the region 405b primarily using heat energy released from oxidizing low concentration fuel in the region 405a may include heating the region 405b using only heat energy released from oxidizing fuel below the LEL concentration in the region 405a. As another example, the majority (e.g., over half) of the heat energy used to raise the temperature of the region 405b may be heat energy released from oxidizing fuel in the region 405a. In some instances, where the region 405b is heated primarily using heat energy released from oxidizing fuel in the region 405a, the region 405b would not reach the oxidation temperature without the heat energy from oxidizing the fuel in the region 405a.

As the region 405b heats up, additional fuel may be communicated into the reaction chamber 400 through the gas distribution system 407. The fuel may initially be communicated into the reaction chamber 400 through the gas distribution system 407 at a slow flow rate while the region 405b continues heating. The flow rate may be gradually increased until the interior of the reaction chamber 400 achieves a desired operating temperature. For example, the desired operating temperature of the reaction chamber 400 may be a recommended or maximum inlet temperature of a turbine in fluid communication with the outlets 412. The desired operating temperature may be lower than a temperature that causes formation of nitrogen oxides. In an example implementation, the desired operating temperature is between 1600° F. and 1700° F.

After the reaction chamber 400 has achieved a desired operating temperature and/or a desired operating temperature profile, the reaction chamber 400 may sustain a continuous oxidation process. An example of a sustained oxidation mode of operation is shown in FIG. 4. As shown in FIG. 4, the example gas distribution system 407 extending through the oxidation zone in the reaction chamber 400 communicates fuel into the oxidation zone at multiple locations along the fuel flow path. The fuel flows through the reaction chamber inlet 402, through the sparger 410, through the ports 422, through the arms 408, and through the ports 409 into the oxidation zone. The fuel is oxidized in the oxidation zone and communicated through the reaction chamber 400.

During the sustained oxidation process, the temperature and/or pressure profile of fluids in the reaction chamber 400 may be substantially uniform throughout the inner volume of the reaction chamber 400. In some instances, there may be temperature and/or pressure differences between one or more regions inside the reaction chamber 400. In some instances, there may be temperature and/or pressure gradients across one or more regions inside the reaction chamber 400.

Figure 5A:
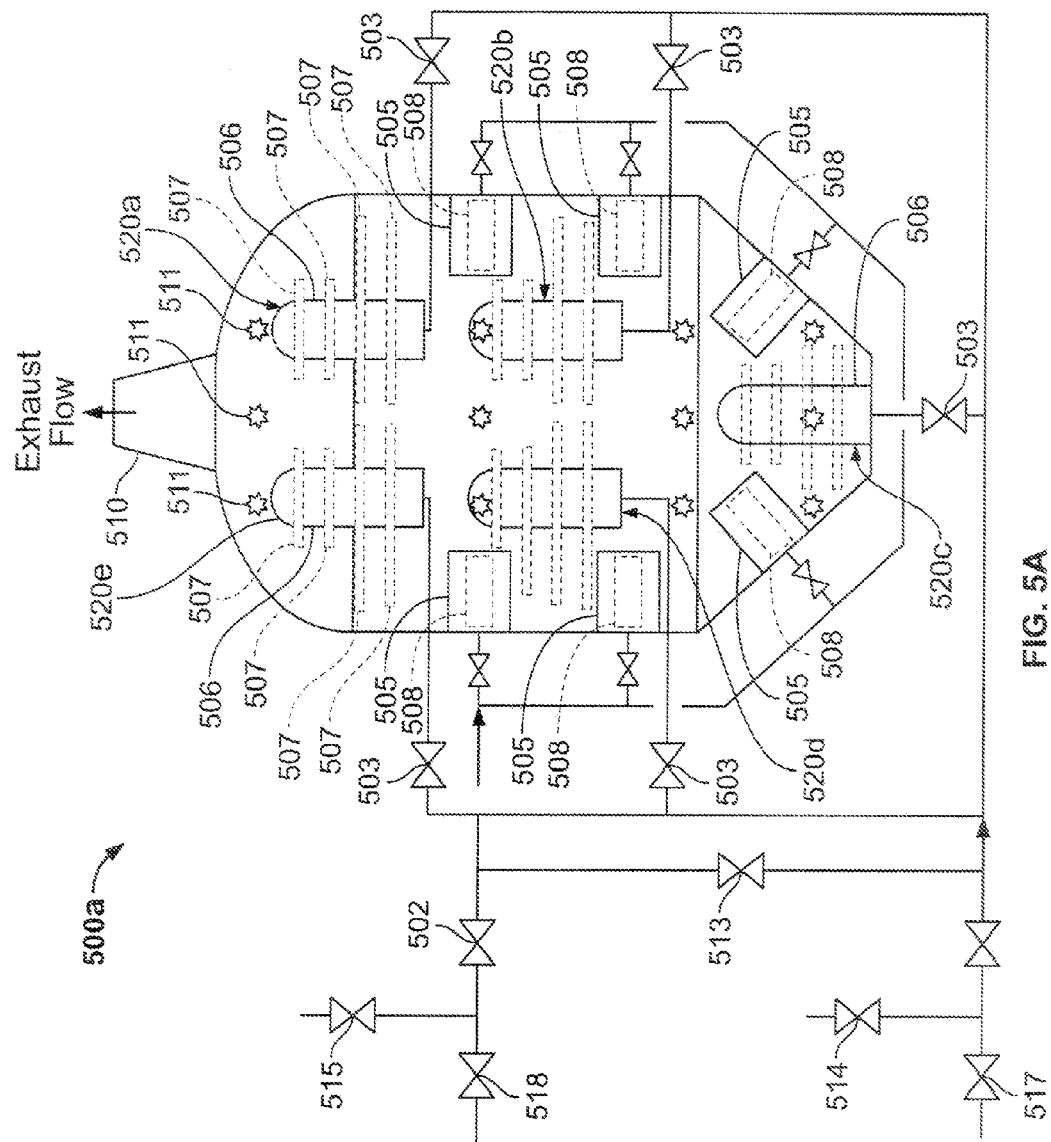

FIG. 5A is a diagram of an example reaction chamber 500a. For example, the reaction chamber 500a can be used as the reaction chamber 101 of FIG. 1. The reaction chamber 500a may additionally or alternatively include features of the other example reaction chambers described herein. The reaction chamber 500a includes a gas distribution system having multiple gas distribution structures 520a, 520b, 520c, 520d, and 520e (collectively, "gas distribution structures 520") in different oxidation zones within the inner volume of the reaction chamber 500a. Each distribution structure 520 extends through an oxidation zone in the reaction chamber and communicates fuel into the oxidation zone at multiple locations. The reaction chamber 500a may be modified to include fewer, additional, or the same number of gas distribution structures in a similar or different configuration.

The valve 517 may provide gas (e.g., fuel or an air/fuel mixture) that has been compressed and/or preheated (e.g., by a compressor and/or a heat exchanger), and the valve 518 may provide an additional flow of gas that has not been compressed or preheated. Fuel provided through the valves 517, 518 may include fuel from the same fuel source. Air may be supplied to each supply line through valves 514, 515, for example, to keep a desired concentration of air and fuel. In some instances, the concentration of fuel in the resulting air/fuel mixture is below the LEL. Valve 513 provides a cross tie between the two fuel sources. Following oxidation of the fuel in the reaction chamber 500a, hot gases exit the reaction chamber 500a through the reaction chamber outlet 510. Temperature sensors 511 are located at desired locations in the reaction chamber 500a. Pressure sensors may also be placed at desired locations in the reaction chamber 500a.

Each of the gas distribution structures 520 can include a structure similar to the structure of the gas distribution system 407 of FIGS. 3 and 4; and each of the gas distribution structures 520 can function in a manner similar to the gas distribution system 407 of FIGS. 3 and 4. For example, each of the gas distribution structures 520 includes a sparger 506 that carries gas distribution arms 507. The sparger 506 and the distribution arms 507 may include features and characteristics shown and/or described with respect to the sparger 410 and the arms 408 of FIGS. 3 and 4. For example, the sparger 506 and/or the distribution arms 507 may include a plurality of sparger inlets arranged to communicate fluid into the region about the gas distribution structure 520. Each of the gas distribution structures 520 is near a heater 505 and an associated air/fuel inlet 508. The air/fuel inlets 508 are arranged to communicate fuel into a region about the associated heater 505. The heater 505 and the air/fuel inlet 508 may be used to heat multiple regions within the reaction chamber at the same time or at different times during a heat-up mode of operation of the reaction chamber 500a. For example, the heaters 505 and air/fuel inlet 508 may function similar to the heaters 404 and air/fuel inlets 403 of FIGS. 3 and 4. A heat-up process may utilize all or fewer than all of the heaters 505 and air/fuel inlets 508. One or more of the heaters 505 and one or more of the air/fuel inlets 508 may be utilized during a sustained oxidation mode of operation.

In the example shown, each of the air/fuel inlets 508 is arranged to communicate gas into a region about one of the heaters 505, and each of the spargers 506 is arranged to distribute gas into a different, nearby region in the reaction chamber 500a. The regions about the spargers 506 may be heated by heat energy released by oxidation of low-concentration fuel in the regions about the heaters 505. For example, oxidation of fuel having a concentration below the LEL may serve as a primary source of heat for bringing the region about the sparger 506 to an operating temperature.

During sustained operation, the spargers 506 and/or the air/fuel inlets 508 may communicate air and/or fuel into the reaction chamber. Temperature stability may be achieved by a combination of controls. Fuel concentration through the spargers 506 can be controlled by manipulating valves 514 and 517 to provide a desired fuel concentration. If the temperature inside the reaction chamber 500a increases beyond a desired temperature range, the fuel flow, fuel concentration, or both can be reduced. If the temperatures inside the reaction chamber 500a decrease below a desired temperature range, the fuel flow into the vicinity to the temperature increase can be reduced using one or more of the valves 503. Each of the valves shown in FIG. 5A can be controlled independently. Another control option is to modify the heat intensity of heaters 505 and/or air/fuel inlets 508.

During a heat-up mode, the fill material about the interior volume inside the reaction chamber may be heated sufficiently to sustain the oxidation reaction. This may be achieved by first turning on one or more of the heaters 505 until a heated region is created around the activated heaters 505. When the heaters 505 are sufficiently hot (e.g., 1400° F.), a fuel and air mixture of desired concentration is introduced into the hot region through air/fuel inlets 508, and the flow rate is controlled to ensure that the entering gas is fully oxidized. Heat released by oxidation increases the size of the hot zone, which increases the quantity of gas that can now be oxidized by the hot zone. Thus, gas flow is gradually increased, and in time, the entire vessel including fill material inside the vessel is sufficiently hot. When the entire vessel is hot, the compressed, pre-heated gas mixture may be introduced through valves 503 at a rate consistent with full oxidation of the gas. Heaters 505 and air/fuel inlets 508 may be maintained in service continuously, or as needed. If hot spots develop inside the reaction chamber 500a, one or more ports may be provided at various locations along the sidewall of the reaction chamber 500a to inject nitrogen into the hot spot until it cools off. If cold spots develop inside the reaction chamber 500a, propane or other high energy fuel may be injected into the cold spot until it reheats. The same ports may be used for both nitrogen and propane. Any other inert gas or fuel such as carbon dioxide, natural gas, butane or liquid fuel may be used instead of nitrogen and propane. The control of hot or cold spots, as described, may be used occasionally to recover from transient conditions.

Figure 5B:
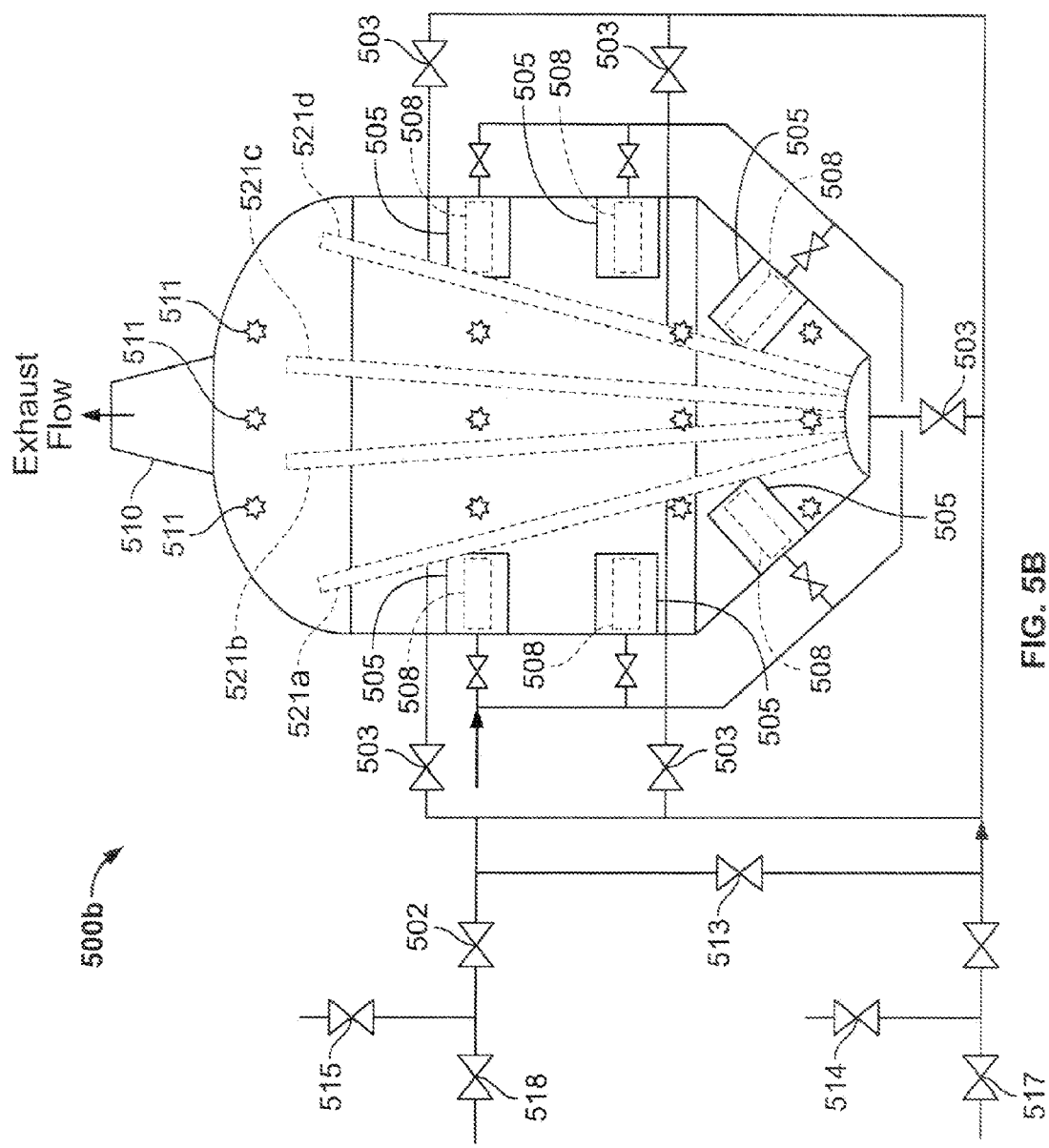

FIG. 5B is a diagram of another example reaction chamber 500b. For example, the reaction chamber 500b can be used as the reaction chamber 101 of FIG. 1. The reaction chamber 500b is a variation of the reaction chamber 500a of FIG. 5A. Whereas the reaction chamber 500a of FIG. 5A includes multiple gas distribution structures 520a, 520b, 520c, 520d, and 520e, the reaction chamber 500b includes a set of distribution tubes 521a, 521b, 521c, and 521d (collectively, tubes 521). The tubes 521 extend at varying angles from a longitudinal direction through the interior of the reaction chamber 500a. The tubes 521 include multiple ports along the longitudinal lengths of the tubes 521. The valves 503 may control the flow of fuel into the tubes 521 at multiple locations along the length of the tubes. The ports along the length of the tubes 521 distribute the fuel into an oxidation zone surrounding the tubes 521 at different locations along a primary flow direction through the reaction chamber 500b. As in the reaction chamber 500a, the primary direction of flow through the reaction chamber 500b is in the direction from the inlet to the outlet 510. The air/fuel inlets 508, the heaters 505, and other aspects of the reaction chamber 500b may function as the air/fuel inlets 508, the heaters 505, and similar aspects of the reaction chamber 500a.

FIG. 5C is a diagram of another example reaction chamber 500c. For example, the reaction chamber 500c can be used as the reaction chamber 101 of FIG. 1. The reaction chamber 500c is a variation of the reaction chamber 500b of FIG. 5B. Whereas the reaction chamber 500b of FIG. 5B includes multiple valves 503 that control the flow of fuel into the tubes 521 at multiple locations along the length of the tubes 521, the reaction chamber 500c of FIG. 5C includes a single valve 503 that controls a flow of fuel into the tubes at a first end of the reaction chamber near the inlet. Also, the reaction chamber 500c only includes heaters 505 and a air/fuel inlets 508 at a first end of the reaction chamber near the inlet. An air/fuel mixture having a low concentration may be communicated into the reaction chamber through the air/fuel inlets 508 and oxidized in the region about the heaters 505. Oxidation of the low-concentration fuel in the region about the heaters 505 may serve as a primary heat source for raising the temperature in other regions in the reaction chamber to at least a temperature sufficient to oxidize the fuel. Other aspects of the reaction chamber 500c may function similar the reaction chamber 500b.

Figure 5D:
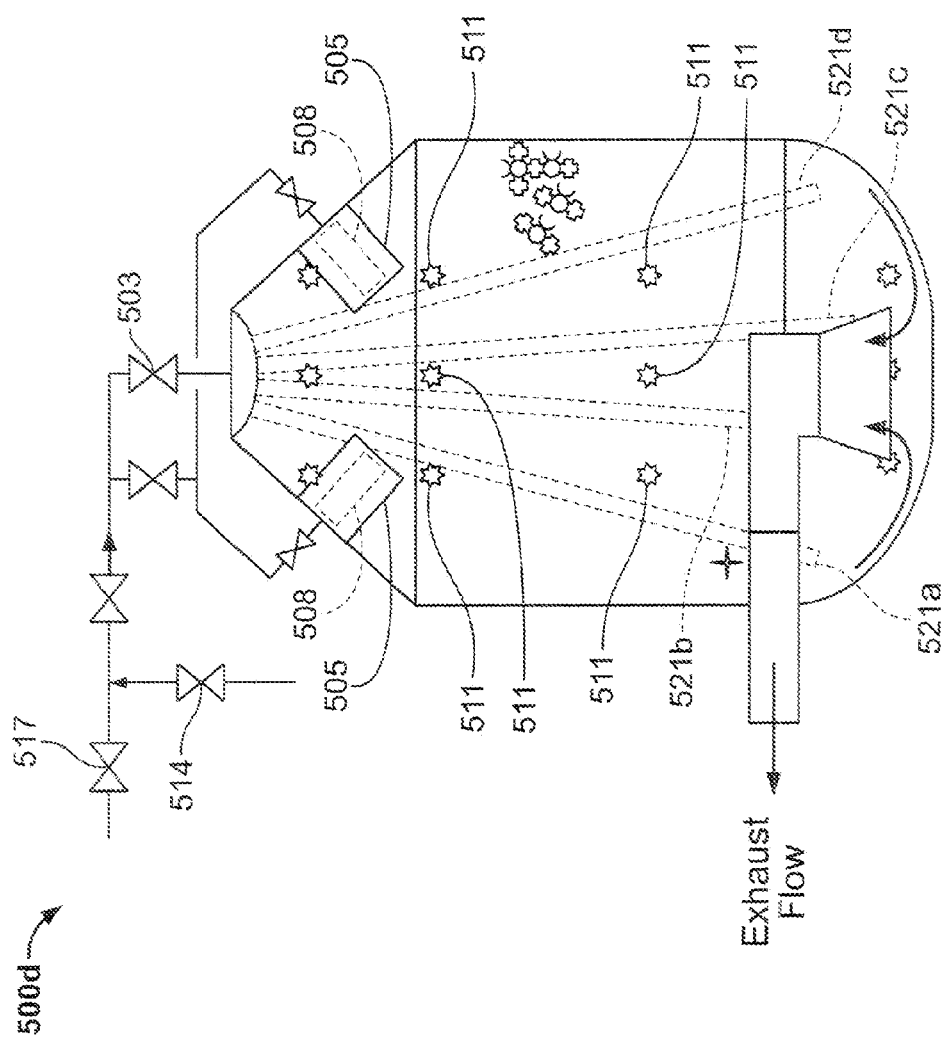

FIG. 5D is a diagram of another example reaction chamber 500d. For example, the reaction chamber 500c can be used as the reaction chamber 101 of FIG. 1. The reaction chamber 500d is a variation of the reaction chamber 500c of FIG. 5C, but inverted. As such, flow exits through an inverted outlet near the bottom of the chamber 500d. Other aspects of the reaction chamber 500d may function similar the reaction chamber 500c. As in FIGS. 5A, 5B, and 5C, an air/fuel mixture having a low concentration may be communicated into the reaction chamber through the air/fuel inlets 508 and oxidized in the region about the heaters 505, and oxidation of the low-concentration fuel in the region about the heaters 505 may serve as a primary heat source for raising the temperature in other regions in the reaction chamber to at least a temperature sufficient to oxidize the fuel.

Figure 6:
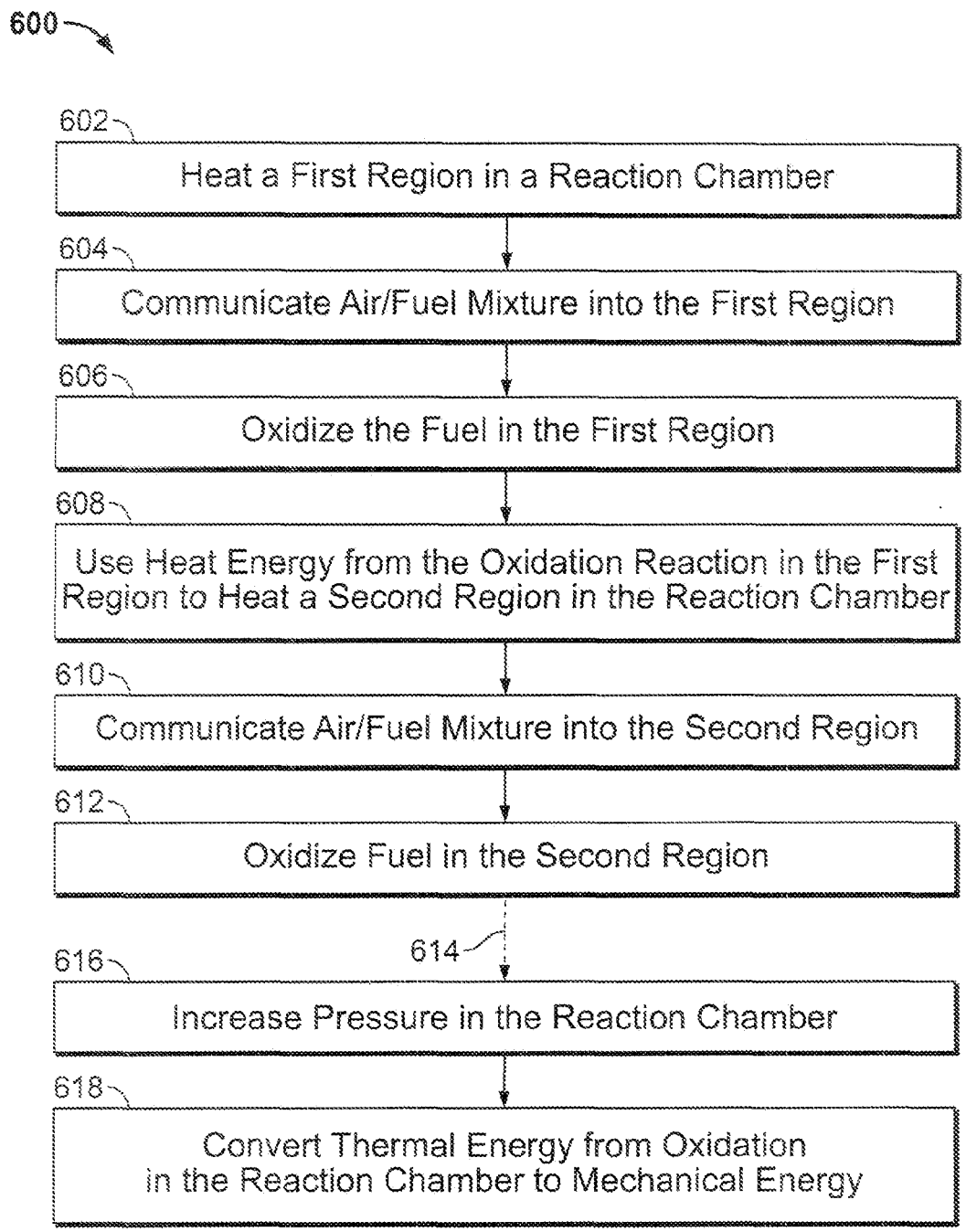
FIG. 6 is a flow chart of an example technique for heating a reaction chamber.

FIG. 6 is a flow chart of an example process 600 for heating a reaction chamber. The process 600 can be used for heating an oxidation reaction chamber in a gas turbine system, such as the gas turbine system 100 of FIG. 1. The process 600 may include additional, fewer, and/or different operations performed in the order shown in FIG. 6 or in a different order. Aspects of the process 600 may be adapted for heating other types of systems. For example, aspects of the process 600 may be adapted for heating a thermal oxidizer system that does not drive a turbine or provide energy conversion. Accordingly, individual operations and/or subsets of the operations of the example process 600 can be implemented in isolation and/or in other contexts for other purposes. Further, in some implementations, one or more of the operations of the process 600 may be omitted, repeated, performed in parallel with other operations, and/or performed by a separate system.

At 602, a first region within a reaction chamber is heated. The first region may be any region within the reaction chamber. For example, the first region may be near or adjacent to an inlet that communicates an air/fuel mixture into the reaction chamber. A heater in the reaction chamber can heat the first region. For example, a heating element of the heater may be partially or wholly contained in the first region, or the heating element may be near or adjacent to the first region. The heater can be any type of heater that can provide heat energy to the first region. For example, the heater may include an electrical heater, a gas-burning heater, a solar-powered heater, a nuclear-powered heater, and/or another type of heater. In some implementations, the heater operates without burning highly-concentrated fuels.

As a result of heating the first region at 602, the temperature of the first region is raised to at least an oxidation temperature of an air/fuel mixture, so that the fuel of the air/fuel mixture may be oxidized in the first region. In some implementations, the first region is initially below an oxidation temperature before heating the first region at 602. The first region may constitute a small or large fraction of the internal volume of the reaction chamber. In some instances, the first region constitutes only a small fraction of the internal volume of the reaction chamber. For example, in some implementations, at 602, only two percent, five percent, or another small fraction of the internal volume of the reaction chamber is heated to at least the oxidation temperature for the air/fuel mixture. As such, even after the first region has been heated (at 602), all or part of the remaining volume in the reaction chamber (e.g., ninety-five percent of the internal volume) may remain below the oxidation temperature.

At 604, the air/fuel mixture is communicated into the first region in the reaction chamber. The air/fuel mixture is received in the first region while the temperature of the second region in the oxidation reaction chamber is below the oxidation temperature sufficient to oxidize the fuel of the received air/fuel mixture. For example, in some implementations, the air/fuel mixture is communicated into the first region of the reaction chamber while fifty, seventy, ninety, or ninety-five percent of the internal volume of the oxidation reaction chamber is below the oxidation temperature. The air/fuel mixture may have a low concentration of fuel. For example, a concentration of the fuel in the received air/fuel may be below a lower explosive limit (LEL) of the fuel. In some implementations, the received air/fuel mixture cannot sustain a flame.

At 606, the fuel is oxidized in the first region. The fuel is oxidized based on raising the temperature of the air/fuel mixture to a temperature that causes the fuel to oxidize, without the need for an ignition source or an oxidation catalyst material. As such, although an ignition source or an oxidation catalyst may used in some implementations, the startup process 600 may be carried out without using a ignition source or an oxidation catalyst material. Oxidation of the fuel in the first region is an exothermic reaction that releases heat energy.

At 608, the heat energy released by the oxidation of fuel in the first region (606) is used to heat the second region in the reaction chamber. The second region may be any region within the reaction chamber outside of the first region. The second region may be adjacent to or spaced-apart from the first region. The second region may be located downstream of the first region. For example, the interior of the reaction chamber may define a direction of flow through the reaction chamber, and the second region may be downstream of the first region. The second region may be may include additional or different locations in the reaction chamber. For example, the second region may reside upstream of the first region, downstream of the first region, and/or in a different flow stream that the first region. Heat energy may be transferred from the first region to the second region by any mode of heat transfer. For example, heat energy may be transferred by conduction, convection, radiation, and/or other modes of heat transfer. In some instances, raising the temperature of the second region raises a temperature of fill material about the second region.

In some implementations, prior to heating the second region at 608, the temperature in the second region is below the oxidation temperature sufficient for oxidizing fuel in the second region. The heat energy from oxidizing the fuel in the first region (at 606) may be used as a primary source of heat energy for raising the temperature of the second region to at least the oxidation temperature. As such, oxidation of an air/fuel mixture having a low concentration (e.g., a concentration below the lower explosive limit, or another concentration) may be used as a primary source of heat energy for bringing the second region—and possibly additional regions—of the reaction chamber to an operating temperature. In some cases, other sources of heat, in addition to the oxidation of the low-concentration fuel in the first region, may contribute to heating the second region. For example, heat energy from the heater in the first region and/or in another region, heat energy from combustion of other fuels in the first region and/or in another region, and/or heat energy from other sources or locations may be transferred to the second region. In such cases, the oxidation of the low-concentration fuel in the first region may serve as the primary source of heat energy for raising the temperature of the second region to at least the oxidation temperature. For example, the primary source of heat energy may provide the majority of heat energy compared to other sources of heat energy, and/or the primary source of heat energy may provide all of the heat energy.

In some implementations, at 608, the second region is heated while the reaction chamber is at a low internal pressure. For example, the second region may be heated while the reaction chamber is at, below, or near an atmospheric pressure. For example, in some instances, the second region is heated to the oxidation temperature while the internal volume of the reaction chamber is at or below two pounds per square inch gauge. The gauge pressure of the internal volume refers to the pressure difference between the internal volume and the ambient conditions about the exterior of the reaction chamber.

The second region may constitute a small or large fraction of the internal volume of the reaction chamber. For example, at 608, five, ten, twenty-five or a larger percent of the internal volume of the reaction chamber may be heated to at least the oxidation temperature for the air/fuel mixture. As such, even after the second region has been heated (at 608), additional regions in the reaction chamber may or may not remain below the oxidation temperature sufficient to oxidize the air/fuel mixture.

After heating the second region to the oxidation temperature, fuel may be oxidized in the second region. At 610, the air/fuel mixture is communicated into the second region. For example, the second region may be near or adjacent to an inlet that communicates the air/fuel mixture into the reaction chamber. In some instances, a first flow of the air/fuel mixture is communicated into the first region through a first inlet (at 604), and a second flow of the air/fuel mixture is communicated into the second region through a second inlet (at 610). In some instances, the air/fuel mixture may be communicated into the second region by an inlet that is space apart from the second region. The air/fuel mixture communicated into the second region at 610 may have the same constituents as the air/fuel mixture that is communicated into the first region at 604, or the air/fuel mixture communicated into the second region at 610 may be a different air/fuel mixture than is communicated into the first region at 604. In any event, the air/fuel mixture communicated into the second region may have a low concentration of fuel (e.g., a concentration below a lower explosive limit (LEL) of the fuel and/or a concentration that is unable to sustain a flame). As the air/fuel mixture is received in the second region, the temperature of the other regions outside the second region in the reaction chamber may be below the oxidation temperature sufficient to oxidize the fuel of the received air/fuel mixture.

At 612, the fuel is oxidized in the second region. The fuel is oxidized based on raising the temperature of the air/fuel mixture to a temperature that causes the fuel to oxidize, without the need for an ignition source or an oxidation catalyst material. As such, although an ignition source or an oxidation catalyst may be used in some implementations, the startup process 600 may be carried out without using a ignition source or an oxidation catalyst material. Oxidation of the fuel in the second region is an exothermic reaction that releases heat energy.

At 614, other regions in the reaction chamber may be heated by heat energy released by oxidation of fuel in the reaction chamber. For example, a third region, a fourth region, and/or additional regions outside the first and second regions may be heated primarily by heat energy released by oxidation of low-concentration fuel in the first and/or second region. As such, the operations of (608) using heat energy released by oxidation of fuel (e.g., fuel of a low-concentration air/fuel mixture) in a region of the reaction chamber to heat another region of the reaction chamber, (610) communicating an air/fuel mixture into the other region, and (612) oxidizing the fuel in the other region can be repeated and/or performed in parallel for different zones in the reaction chamber. For example, the operations (608, 610, 612) can be repeated and/or performed in parallel in multiple zones in the reaction chamber until the entire internal volume of the reaction chamber has reached an operating temperature, e.g., a temperature sufficient to oxidize the fuel. In some implementations, one or more of the other regions may be heated (e.g., completely heated, partially heated, primarily heated, and/or secondarily heated) by another source of heat energy (e.g., a heater).

Oxidation of the fuel of the air/fuel mixture in the reaction chamber can release sufficient heat energy to maintain the operating temperature of the reaction chamber. As such, in cases where a heater is used to heat the first region, the heater may be turned off at any time after the first and/or second regions have been heated. During operation, the reaction chamber may fully oxidize the fuel communicated into the reaction chamber. Moreover, the temperature in the reaction chamber may be maintained below a temperature that causes formation of nitrogen oxides, VOCs, and/or other harmful materials.

At 616, pressure in the reaction chamber is increased. For example, some or all of the internal volume of the reaction chamber may be heated while fluids in the internal volume remain at or near atmospheric pressure, e.g., two pounds per square inch gauge, or less, and the internal pressure of the reaction chamber may be increased after this heating. In some instances, the pressure in the reaction chamber may be gradually increased to forty pounds per square inch gauge, or another pressure. In some instances, the reaction chamber includes flow outlets coupled to a turbine. Raising the pressure in the reaction chamber may bring the reaction chamber to an operating pressure at which the turbine outputs energy.

At 618, thermal energy from the oxidation product is converted to rotational mechanical energy. For example, the oxidation product can be used to drive a turbine, such as the turbine 115 of FIG. 1. The oxidized fuel may be communicated to the turbine from the reaction chamber through one or more reaction chamber outlets. Driving the turbine may include receiving the oxidation product into the turbine through an inlet of the turbine, expanding the oxidation product in the turbine, and communicating the expanded oxidation product out of the turbine through a turbine outlet. Expanding the oxidation product in the turbine may convert heat energy of the oxidation product to rotational movement of the turbine. The rotational movement of the turbine may be transferred to other system components and/or to other systems. For example, the turbine may be coupled to a shaft that drives a compressor, a generator, and/or another type of system or system component.

From the turbine, the oxidation product may be communicated to a heat exchanger, which may transfer and/or utilize remaining heat energy from the oxidation product gas. For example, the oxidation product gas may be communicated to the heat exchanger 117 of FIG. 1, where heat energy from the oxidation product gas can be used to pre-heat an air/fuel mixture prior to communicating the air/fuel mixture into the reaction chamber.

A number of embodiments have been described. Nevertheless, it will be understood that various modifications may be made without departing from the spirit and scope of this disclosure. Accordingly, other embodiments are within the scope of the following claims.

What is claimed is:

1. A method for heating an oxidation reaction chamber, the method comprising:
   receiving an air/fuel mixture in a first inlet and a second inlet of an oxidation reaction chamber, a concentration of the fuel in the received air/fuel mixture being below a lower explosive limit of the fuel, the air/fuel mixture being received in the oxidation reaction chamber while a temperature of a first region in the oxidation reaction chamber is below an oxidation temperature sufficient to oxidize the fuel of the received air/fuel mixture from the first inlet;
   raising the temperature of the first region to at least the oxidation temperature sufficient to oxidize the fuel of the received air/fuel mixture, the temperature being raised primarily using a portion of the heat energy released from oxidizing the air/fuel mixture in a second, different region in the reaction chamber
   using a heater to heat the second region of the reaction chamber to at least the oxidation temperature; and
   generating the heat energy by oxidizing the air/fuel mixture in the second region.

2. The method of claim 1, further comprising:
   after raising the temperature of the first region to at least the oxidation temperature, receiving additional air/fuel mixture flow in the first region while a temperature of a third region in the oxidation reaction chamber is below the oxidation temperature; and
   raising the temperature of the third region to at least the oxidation temperature primarily using a portion of the heat energy released from oxidizing the additional air/fuel mixture in the first region.

3. The method of claim 2, wherein raising the temperature of the first region comprises transferring the heat energy from the second region to the first region.

4. The method of claim 3, wherein transferring the heat energy comprises at least one of transferring by convection, transferring by conduction, or transferring by radiation.

5. The method of claim 2, wherein receiving the air/fuel mixture comprises receiving a flow of the air/fuel mixture through a second inlet into the second region, the method further comprising receiving an additional flow of the air/fuel mixture through a first inlet into the first region after raising the temperature of the first region to at least the oxidation temperature.

6. The method of claim 2, further comprising:
   turning off the heater; and
   after turning off the heater, maintaining the temperature of the first region and the temperature of the second region at least at the oxidation temperature primarily using heat energy released from oxidizing the air/fuel mixture in the reaction chamber.

7. The method of claim 1, further comprising raising a temperature substantially throughout the oxidation reaction chamber to at least the oxidation temperature primarily using heat energy released from oxidizing the air/fuel mixture in the reaction chamber.

8. The method of claim 7, further comprising maintaining the temperature substantially throughout the oxidation reaction chamber below a temperature that causes formation of nitrogen oxides.

9. The method of claim 1, wherein raising the temperature of the first region raises a temperature of thermal capacitance material about the region.

10. The method of claim 1, wherein receiving an air/fuel mixture comprises receiving the air/fuel mixture in the oxidation reaction chamber while at least 95 percent of an internal volume of the oxidation reaction chamber is below the oxidation temperature.

11. The method of claim 1, wherein the received air/fuel mixture cannot sustain a flame.

12. The method of claim 1, wherein raising a temperature of the first region comprises raising the temperature of the first region while an internal pressure of the oxidation reaction chamber is at or below two pounds per square inch gauge.

13. The method of claim 12, further comprising raising the internal pressure of the oxidation reaction chamber above two pounds per square inch gauge.

14. The method of claim 13, further comprising communicating oxidation product from an outlet of the oxidation reaction chamber to an inlet of a turbine, wherein raising the internal pressure of the oxidation reaction chamber comprises raising the internal pressure to a pressure at which the turbine outputs energy.

15. A system for oxidizing fuel, the system comprising:
   an oxidation reaction chamber comprising an internal volume that includes a first region and a second, different region;
   a first inlet into the reaction chamber arranged to communicate a first air/fuel mixture from fuel and air sources into the first region;
   a second inlet into the reaction chamber arranged to communicate a second air/fuel mixture from the fuel and air sources into the second region, the second air/fuel mixture flow having a concentration of fuel below a lower explosive limit for the fuel;
a heater in the second region arranged to heat the second region to at least an oxidation temperature sufficient to oxidize the fuel of the second air/fuel mixture flow; and
the reaction chamber arranged to communicate to the first region sufficient heat energy from oxidizing the fuel in the second region to raise the temperature of the first region from below the oxidation temperature to at least the oxidation temperature.

16. The system of claim 15, further comprising a fuel distributor disposed in the internal volume and defining a plurality of distributor inlets arranged to communicate fluid into the first region, the plurality of distributor inlets including the first inlet.

17. The system of claim 16, further comprising an additional fuel distributor disposed in the internal volume and defining an additional plurality of distributor inlets arranged to communicate fluid into the second region, the additional plurality of distributor inlets including the second inlet.

18. The system of claim 15, further comprising:
a gas turbine having a turbine inlet; and
an outlet from the internal volume in fluid communication with the turbine inlet.

19. The system of claim 18, wherein the gas turbine has a turbine outlet, the system further comprising a blower having a blower inlet in fluid communication with the turbine outlet, the blower configured to provide pressure that induces flow from the internal volume into the turbine.

20. The system of claim 15, wherein the internal volume further comprises a plurality of additional regions, the system comprising a plurality of additional inlets arranged to communicate air/fuel mixture into the additional regions,
the reaction chamber arranged to communicate to at least one of the additional regions heat energy from oxidizing the fuel in at least one other region to raise the temperature of the additional region from below the oxidation temperature to at least the oxidation temperature.

21. The system of claim 15, further comprising a fuel source having a fuel source outlet in fluid communication with the first inlet and the second inlet.

22. The system of claim 21, further comprising a blower in fluid communication with the fuel source outlet and the first inlet and the second inlet, the blower arranged to provide pressure that induces flow through the first inlet and the second inlet into the internal volume of the reaction chamber.

23. The system of claim 15, wherein the heater comprises an electrical heater.

24. A method of heating an oxidation reaction chamber, the method comprising:
receiving an air/fuel mixture to a first inlet of a first region and a second inlet of second region of a reaction chamber, a concentration of the fuel in the received air/fuel mixture below a lower explosive limit of the fuel;
raising a temperature of the first region in the oxidation reaction chamber from an initial temperature below an oxidation temperature sufficient to oxidize the air/fuel mixture to at least the oxidation temperature primarily by oxidizing the air/fuel mixture in the reaction chamber;
using a heater to heat the second region of the reaction chamber to at least the oxidation temperature; and
generating the heat energy by oxidizing the air/fuel mixture in the second region.

25. The method of claim 24, wherein raising the temperature of the first region results in an entire inner volume of the reaction chamber being at or above the oxidation temperature.

26. The method of claim 25, further comprising maintaining the entire inner volume below a temperature that causes formation of nitrogen oxides.

27. The method of claim 24, the method further comprising raising a temperature of the second region in the oxidation reaction chamber from an initial temperature of the second region to at least the oxidation temperature by oxidizing additional air/fuel mixture in the first region.

28. The method of claim 24, wherein raising the temperature of the first region comprises raising the temperature of the first region while the first region is at or below two pounds per square inch gauge pressure, the method further comprising pressurizing the oxidation reaction chamber to above two pounds per square inch gauge pressure.

* * * * *